US010807466B1

(12) United States Patent
Haka et al.

(10) Patent No.: US 10,807,466 B1
(45) Date of Patent: Oct. 20, 2020

(54) ELECTRIC DRIVETRAIN AXLES WITH MULTI-SPEED GEARBOXES

(71) Applicant: DANA HEAVY VEHICLE SYSTEMS GROUP, LLC, Maumee, OH (US)

(72) Inventors: Raymond J. Haka, Brighton, MI (US); Krishna Kumar, Holland, OH (US); Steven J. Wesolowski, Waterville, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 274 days.

(21) Appl. No.: 16/088,289

(22) PCT Filed: Mar. 28, 2017

(86) PCT No.: PCT/US2017/024480
§ 371 (c)(1),
(2) Date: Sep. 25, 2018

(87) PCT Pub. No.: WO2017/172722
PCT Pub. Date: Oct. 5, 2017

Related U.S. Application Data

(60) Provisional application No. 62/314,349, filed on Mar. 28, 2016.

(51) Int. Cl.
*B60K 17/04* (2006.01)
*F16H 37/08* (2006.01)
(Continued)

(52) U.S. Cl.
CPC ............. *B60K 17/046* (2013.01); *B60K 1/02* (2013.01); *B60K 1/04* (2013.01); *B60K 17/02* (2013.01);
(Continued)

(58) Field of Classification Search
None
See application file for complete search history.

(56) References Cited

U.S. PATENT DOCUMENTS 1,117,700 A   11/1914 Piggins
1,258,946 A   3/1918 Russel
(Continued)

FOREIGN PATENT DOCUMENTS

DE   102005026874   12/2006
DE   102005062874   7/2007
(Continued)

OTHER PUBLICATIONS

European Patent Office, International Search Report with Written Opinion issue in PCT/US2017024480, dated Jun. 27, 2017, 14 pages, European Patent Office, Rijswijk, Netherlands.

*Primary Examiner* — Timothy Hannon
(74) *Attorney, Agent, or Firm* — McCoy Russell LLP

(57) ABSTRACT

An electric drivetrain having a primary motor-generator assembly, an electric axle drive unit and a power source. The primary motor-generator assembly includes a primary mover, a first gearbox in driving engagement with the primary mover and a first clutch. The first gearbox is in driving engagement with the primary mover. The electric axle drive unit includes a differential assembly, a second motor-generator assembly in driving engagement with a wheel assembly and a third motor-generator assembly in driving engagement with another wheel assembly. The differential assembly is in selective engagement with the first clutch, the second motor-generator assembly via a first axle clutch, and the third motor-generator assembly via a second axle clutch. The electric axle drive unit is selectively engaged with the primary motor-generator assembly via the first clutch. The second and third motor-generator assem-
(Continued)

blies include a motor-generator and a reducing gearbox portion.

16 Claims, 16 Drawing Sheets

(51) Int. Cl.
*B60K 1/02* (2006.01)
*B60K 17/02* (2006.01)
*B60K 17/22* (2006.01)
*B60K 17/16* (2006.01)
*B60K 1/04* (2019.01)
*F16H 3/66* (2006.01)

(52) U.S. Cl.
CPC ............. *B60K 17/16* (2013.01); *B60K 17/22* (2013.01); *F16H 3/666* (2013.01); *F16H 37/082* (2013.01); *B60Y 2200/91* (2013.01); *F16H 2200/0021* (2013.01); *F16H 2200/0034* (2013.01); *F16H 2200/0039* (2013.01); *F16H 2200/2007* (2013.01); *F16H 2200/2035* (2013.01); *F16H 2200/2038* (2013.01); *F16H 2200/2041* (2013.01); *F16H 2200/2043* (2013.01)

(56) References Cited

U.S. PATENT DOCUMENTS

| | | |
|---|---|---|
| 1,373,142 A | 3/1921 | Midboe |
| 1,421,836 A | 7/1922 | Russel |
| 2,689,015 A | 9/1954 | Nallinger |
| 3,799,284 A | 3/1974 | Hender |
| 5,168,946 A | 12/1992 | Dorgan |
| 5,188,195 A | 2/1993 | Haustein |
| 5,718,300 A | 2/1998 | Frost |
| 5,845,731 A | 12/1998 | Buglione |
| 5,924,504 A | 7/1999 | Ruppert, Jr. |
| 6,295,487 B1 | 9/2001 | Ono |
| 6,295,847 B1 | 10/2001 | Zeren |
| 6,644,247 B2 | 11/2003 | Campion |
| 6,644,427 B2 | 11/2003 | Schulte |
| 6,740,002 B1 | 5/2004 | Stridsberg |
| 6,953,408 B2 | 10/2005 | Thompson |
| 7,028,583 B2 | 4/2006 | Bennett |
| 7,174,978 B2 | 2/2007 | Taniguchi |
| 7,255,187 B2 | 8/2007 | Bell |
| 7,410,017 B2 | 8/2008 | Gradu |
| 7,497,286 B2 | 3/2009 | Keller |
| 7,520,354 B2 | 4/2009 | Morrow |
| 7,520,534 B2 | 4/2009 | Longchamp |
| 7,742,852 B1 | 6/2010 | Tang |
| 7,866,423 B2 | 1/2011 | Ruppert |
| 7,959,534 B2 | 6/2011 | Kasuga |
| 8,011,461 B2 | 9/2011 | Rodriguez |
| 8,944,194 B2 | 2/2015 | Glaser |
| 9,062,744 B2 | 6/2015 | Valente |
| 9,162,586 B2 | 10/2015 | Tang |
| 9,505,304 B1 | 11/2016 | McCoy |
| 10,486,521 B2 * | 11/2019 | Haka ..................... B60K 6/547 |
| 2003/0111280 A1 | 6/2003 | Platner |
| 2003/0205422 A1 | 11/2003 | Morrow |
| 2004/0050597 A1 | 3/2004 | Ai |
| 2005/0109549 A1 | 5/2005 | Morrow |
| 2006/0191168 A1 | 8/2006 | Casey |
| 2007/0038340 A1 | 2/2007 | Sekiguchi |
| 2009/0205422 A1 | 8/2009 | Caron |
| 2009/0242289 A1 | 10/2009 | Murty |
| 2009/0321153 A1 | 12/2009 | Boeckenhoff |
| 2010/0282530 A1 | 11/2010 | Wang |
| 2011/0120788 A1 | 5/2011 | Wang |
| 2011/0259657 A1 | 10/2011 | Fuechtner |
| 2013/0150197 A1 | 6/2013 | Lee |
| 2014/0116793 A1 | 5/2014 | Pelletier |
| 2015/0211616 A1 | 7/2015 | Yang |
| 2016/0091059 A1 | 3/2016 | Boulet |

FOREIGN PATENT DOCUMENTS

| | | |
|---|---|---|
| DE | 102014103485 | 9/2014 |
| EP | 1232892 | 8/2002 |
| EP | 2574490 | 4/2013 |
| EP | 2574491 | 4/2013 |
| EP | 2705968 | 3/2014 |
| EP | 2902234 | 8/2015 |
| EP | 2927036 | 10/2015 |
| FR | 2746352 | 9/1997 |
| FR | 2864191 | 6/2005 |
| GB | 2449489 | 11/2008 |
| JP | 2005081930 | 3/2005 |
| WO | 2007131849 | 11/2007 |
| WO | 2012007030 | 1/2012 |
| WO | 2012007031 | 1/2012 |

* cited by examiner

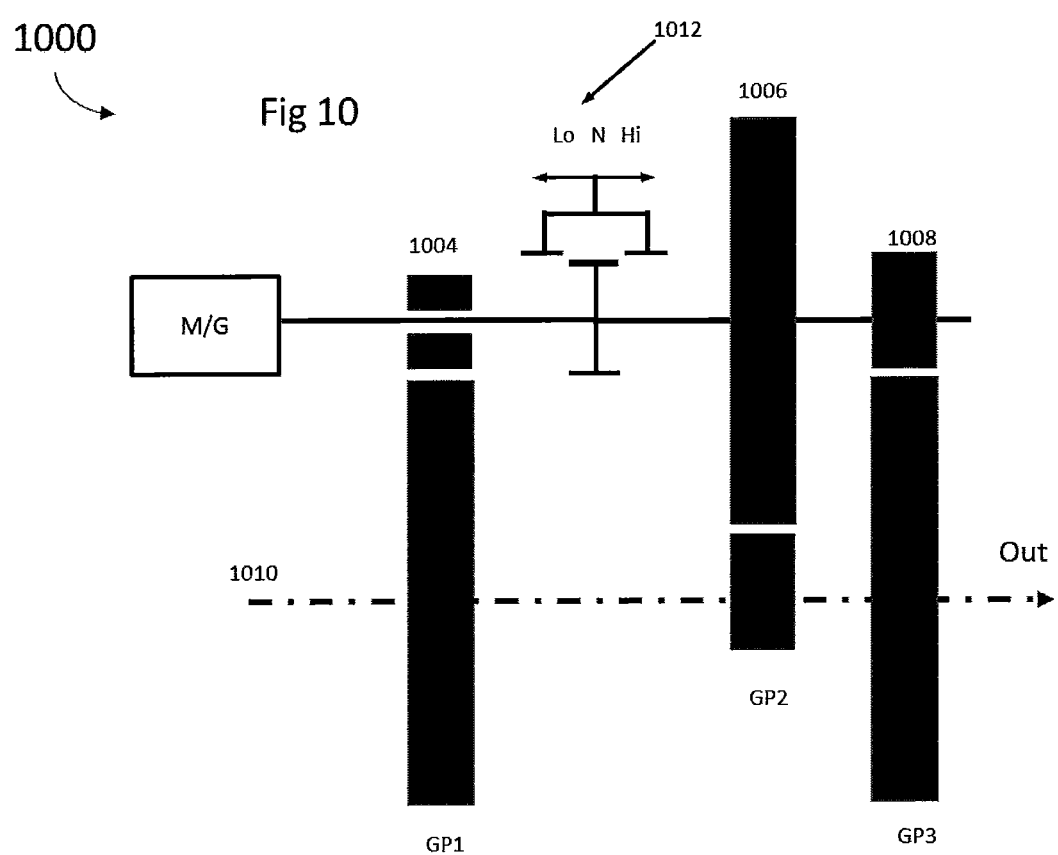

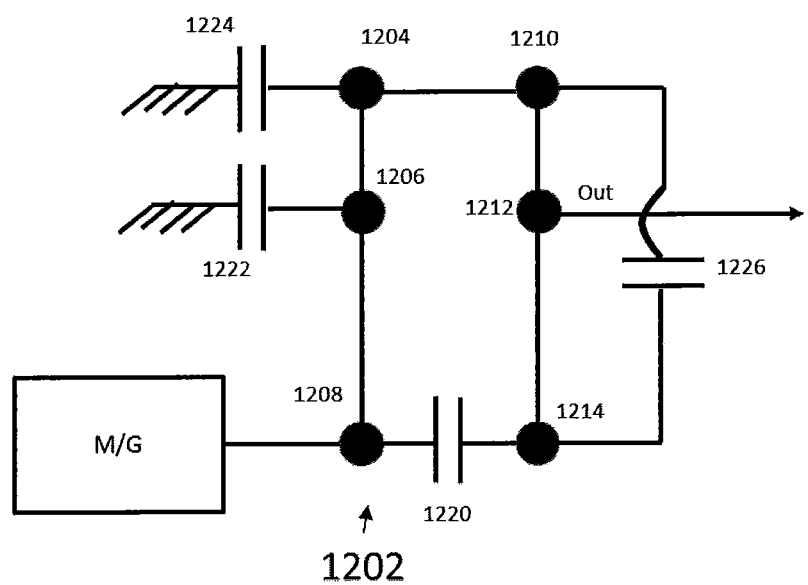

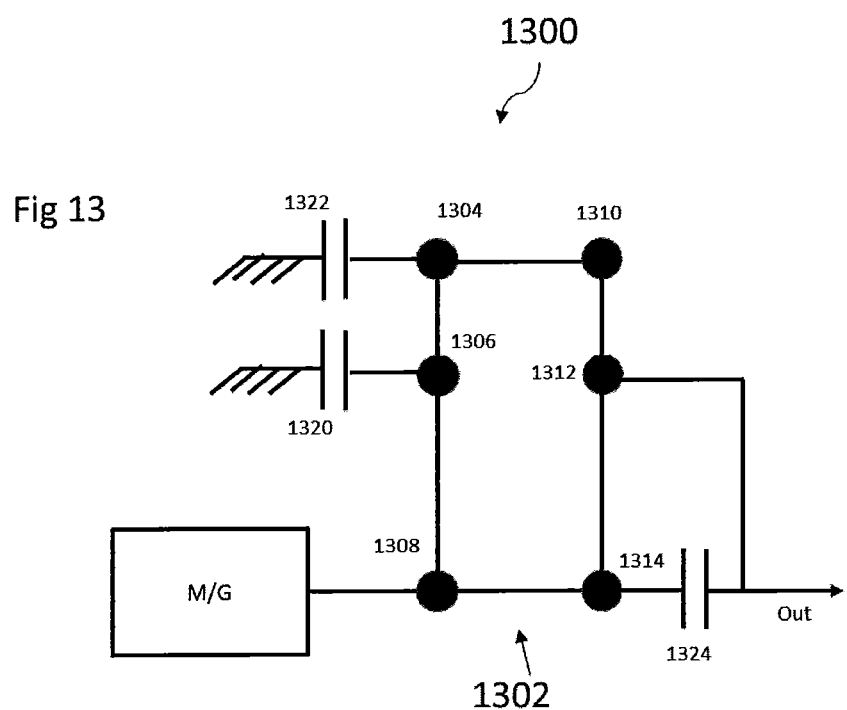

ELECTRIC DRIVETRAIN AXLES WITH MULTI-SPEED GEARBOXES

RELATED APPLICATION

The present application claims priority to and the benefit from Provisional U.S. Patent Application Ser. No. 62/314,349 filed on Mar. 28, 2016. The content of the above-noted patent application is hereby expressly incorporated by reference into the detailed description of the present application.

BACKGROUND

Hybrid and electric vehicles are enjoying increased popularity and acceptance due in large part to the cost of fuel and greenhouse carbon emission government regulations for internal combustion engine vehicles. Hybrid vehicles include both an internal combustion engine as well as an electric motor to propel the vehicle. There is increasing interest in replacing conventional drivetrain architecture with battery electric drivetrain architectures due to pollution concerns, particularly in urban areas, and increasing regulations regarding vehicle emissions. To date, electric drivetrain architectures have shown to be heavy, costly, and complex. Such known architectures have a tendency to increase an unsprung weight of and poorly utilize a space available for a battery electric drivetrain.

It would be advantageous to develop an electric drivetrain architecture that reduces an unsprung weight, increases cost efficiency, and improves drivetrain packaging incorporating the electric drivetrain architecture.

SUMMARY

Provided herein is an electric drivetrain for a motor vehicle having a primary motor-generator assembly, an electric axle drive unit and a power source. The primary motor-generator assembly includes a primary mover, a first gearbox and a first clutch. The first gearbox is in driving engagement with the primary mover and the first clutch and the first clutch is in selective driving engagement with a drive shaft and the primary mover. The electric axle drive unit includes a differential assembly, a second motor-generator assembly in driving engagement with a first wheel assembly, a third motor-generator assembly in driving engagement with a second wheel assembly, a first axle clutch and a second axle clutch. The power source is in communication with the second motor-generator assembly and the third motor-generator assembly. The differential assembly is in selective driving engagement with the first clutch, in selective driving engagement with the second motor-generator assembly via the first axle clutch, and in selective driving engagement the third motor-generator assembly via the second axle clutch. The electric axle drive unit is selectively drivingly engaged with the primary motor-generator assembly via the first clutch. The second motor-generator assembly includes a second motor-generator and a second gearbox portion and the third motor-generator assembly includes a third motor-generator and a third gearbox portion. The third gearbox and second gearbox portions are reduction gearboxes.

BRIEF DESCRIPTION OF THE DRAWINGS

The above, as well as other advantages of the present embodiments, will become readily apparent to those skilled in the art from the following detailed description when considered in the light of the accompanying drawings in which:

FIG. 9b is a lever diagram depicting the gearbox according to FIG. 9a;

FIG. 10 is a schematic style view of a gearbox according to another preferred embodiment;

FIG. 12 is a schematic style view of a gearbox according to another preferred embodiment; and FIG. 13 is a schematic style view of a gearbox according to another preferred embodiment.

DETAILED DESCRIPTION OF THE PREFERRED EMBODIMENTS

It is to be understood that the preferred embodiments may assume various alternative orientations and step sequences, except where expressly specified to the contrary. It is also to be understood that the specific devices and processes illustrated in the attached drawings, and described in the following specification are simply exemplary embodiments of the inventive concepts of the present disclosure. Hence, specific dimensions, directions, orientations or other physical characteristics relating to the embodiments disclosed are not to be considered as limiting, unless expressly stated otherwise.

This electric drivetrain relates to electric powertrain configurations and architectures that will be used in hybrid vehicles and electric vehicles. The powertrains disclosed herein are applicable to HEV, EV and Fuel Cell electric & Hybrid electric systems. It should be understood that electric or hybrid electric vehicles incorporating embodiments of the hybrid architectures disclosed herein are capable of including a number of other powertrain components, such as, but not limited to, high-voltage battery pack with a battery management system or ultracapacitor, on-board charger, DC-DC converters, a variety of sensors, actuators, and controllers, among others.

For purposes of description, schematics referred to as lever diagrams are used herein. A lever diagram, also known as a lever analogy diagram, is a translational-system representation of rotating parts for a planetary gear system. In certain embodiments, a lever diagram is provided as a visual aid in describing the functions of the transmission. In a lever diagram, a compound planetary gear set is often represented, by a single vertical line ("lever"). The input, output, and reaction torques are represented by horizontal forces on the lever. The lever motion, relative to the reaction point, represents direction of rotational velocities. For example, a typical planetary gear set having a ring gear, a planet carrier, and a sun gear is represented by a vertical line having nodes "R" representing the ring gear, node "S" representing the sun gear, and node "C" representing the planet carrier. It should be appreciated that any mechanical coupling is depicted on a lever diagram as a node or a solid dot. For example, a node represents two components in a drivetrain that are rigidly connected.

Figure 1A:
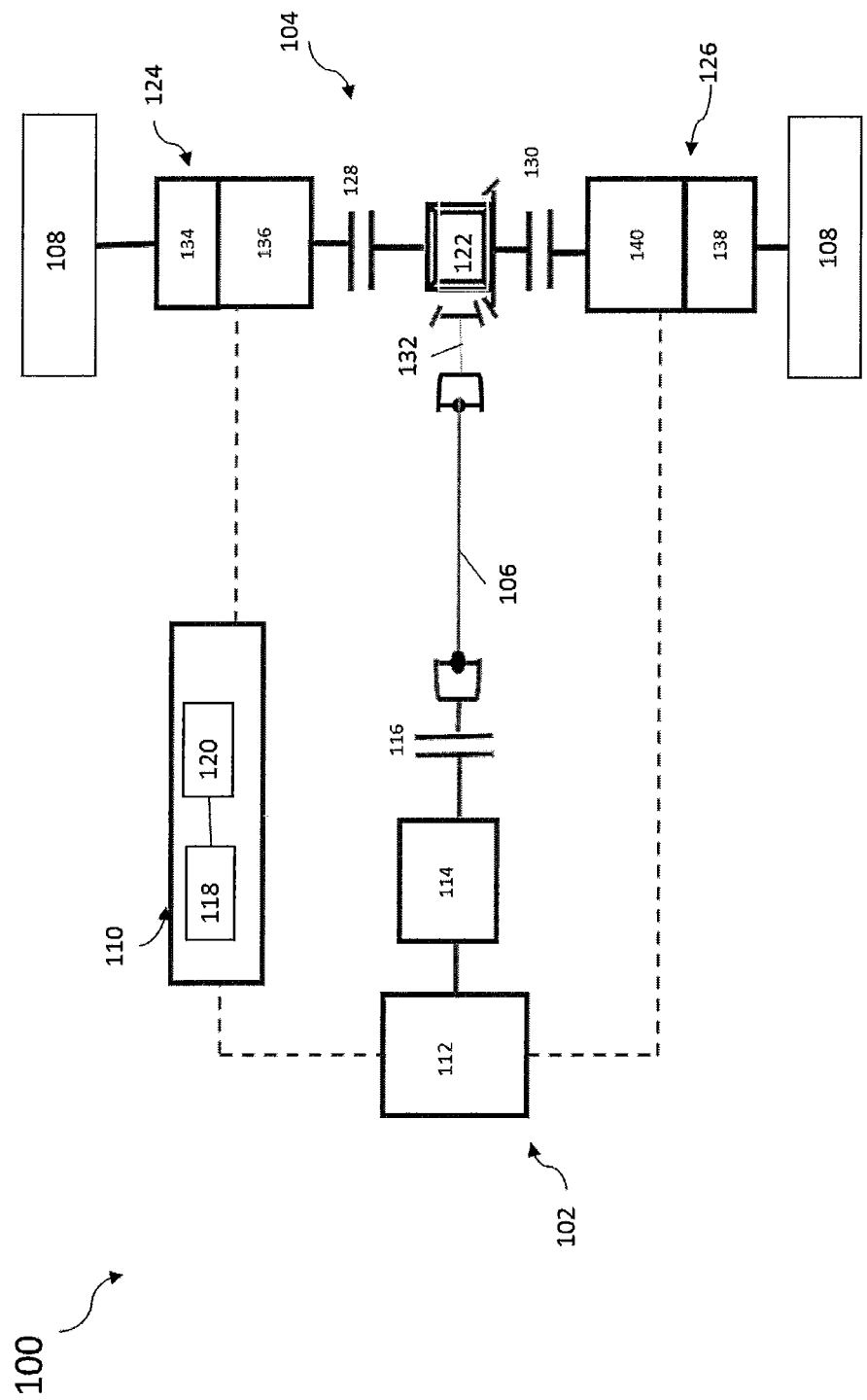
FIGS. 1a-1c are schematic style views of an electric drivetrain according to a preferred embodiment.

FIG. 1a is a schematic style view of an electric drivetrain 100 according to a preferred embodiment. The electric drivetrain 100 includes a primary motor-generator assembly 102 and an electric axle drive unit 104. The electric axle drive unit 104 is drivingly engaged with the primary motor-generator assembly 102 through a drive shaft 106, for example. The electric axle drive unit 104 is also drivingly engaged with a pair of wheel assemblies 108. The primary motor-generator assembly 102 and the electric axle drive unit 104 are in electrical communication with a battery and control assembly 110. The electric drivetrain 100 as shown is a battery electric vehicle drivetrain, and may be operated in a plurality of operating modes.

As depicted in FIG. 1, the drivetrain 100 includes a battery 120 as an energy storage device. However, it is understood that other embodiments may include other power sources including energy storage devices or electrochemical energy conversion devices or combinations thereof including, but not limited to, an ultracapicitor or a fuel cell particularly in a fuel cell electric vehicle drivetrains (FCEV).

The primary motor-generator assembly 102 includes a first motor-generator 112, a gearbox 114, and a primary clutch 116. The gearbox 114 is in driving engagement with the first motor-generator 112 and a portion of the primary clutch 116. A remaining portion of the primary clutch 116 is in driving engagement with the drive shaft 106. The gearbox 114 and the primary clutch 116 are in communication with the battery and the control assembly 110 or another controller. In some embodiments, the drivetrain 100 includes a separate battery controller (not shown) as part of a battery management system (not shown).

In some embodiments, all components of the drivetrain 100 are under the supervisory control of a vehicle system controller (VSC) not shown. Each drivetrain component can have a separate controller under the supervisory control of the VSC.

In some embodiments, the controller 118 and/or VSC is configured to receive a number of electronic signals from sensors provided on the vehicle and/or gearboxes. The sensors optionally include temperature sensors, speed sensors, position sensors, among others. In some embodiments, the controller 118 and the VSC is configured to perform routines such as signal acquisition, signal arbitration, or other known methods for signal processing and is configured to electronically communicate to a variety of actuators and sensors.

The first motor-generator 112 is in driving engagement with the gearbox 114. The first motor-generator 112 is in electrical communication with the battery and control assembly 110. Depending on the electrical control of the first motor-generator 112 using the battery 120 and control assembly 110, the first motor-generator 112 may apply force to or retard the gearbox 114 and any other drivetrain components drivingly engaged therewith. Force is applied by the first motor-generator 112 by converting electrical energy stored in a battery 120 into kinetic energy by rotating an input of the gearbox 114 and any components drivingly engaged therewith. When the input of the gearbox 114 is retarded in response to the electrical control by a controller 118, the first motor-generator 112 generates electrical energy, which may be stored in the battery 120.

The gearbox 114 is a drive ratio-adjusting device including an assembly of gears, clutches, actuators and other components typically used in transmissions. In some embodiments, the gearbox 114 can be, but is not limited to, a dual clutch transmission, an automatic mechanical transmission, a manual gearbox or an automatic gearbox. As a non-limiting example, the gearbox 114 may be a fixed ratio gearbox and may provide a plurality of drive ratios to facilitate an operation of the first motor-generator 112 across a greater number of speed and torque requirements of the electric axle drive unit 104. The gearbox 114 is drivingly engaged with the first motor-generator 112 and a portion of the primary clutch 116. The gearbox 114 is in communication with the controller 118. Additionally, the gearbox 114 may have its own controller (not shown) that is communication with the controller 118 and the VSC. In some embodiments, the gearbox controller coordinates engagement of the clutch 116 and/or the VSC controls the engagement of the clutch 116. In response to communication from one of the controllers or VSC, a drive ratio of the gearbox 114 is adjusted and/or selected.

The primary clutch 116 is a clutch which can be variably engaged, such as a plate or cone style clutch. The primary clutch 116 allows the first motor-generator 112 to drivingly engage the electric axle drive unit 104 when the primary clutch 116 is at least partially engaged. In some embodiments, the primary clutch 116 is also in communication with the controller 118. In response to communication from the controller 118 to the primary clutch 116, the primary clutch 116 is placed in a disengaged, partially engaged, or engaged position. If the primary clutch 116 is disengaged, the first motor-generator 112 is not drivingly engaged to drive unit 104.

Figure 1B:
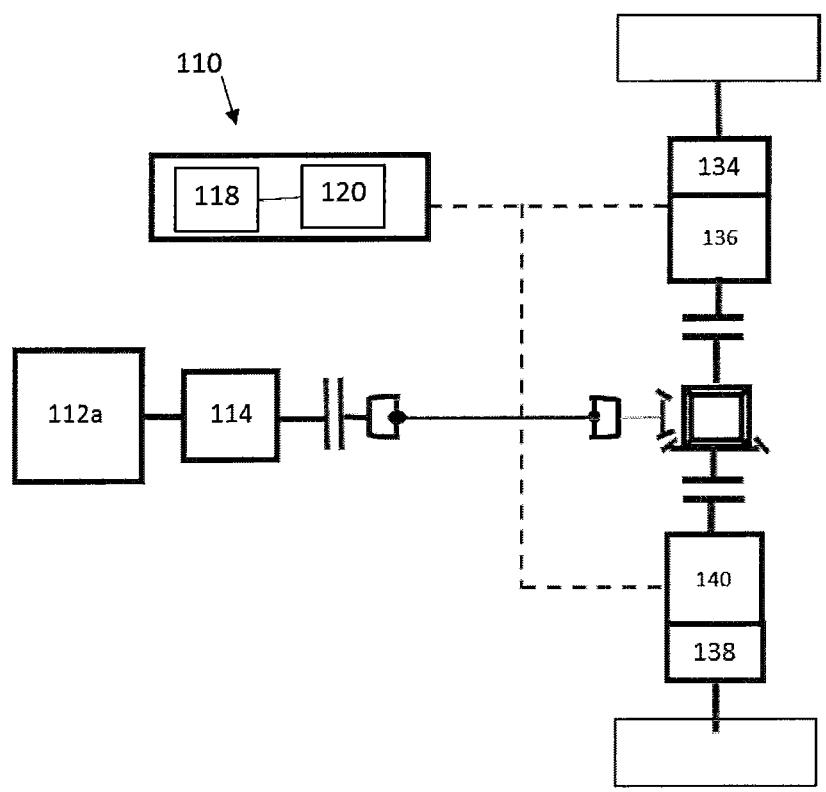
Figure 1C:
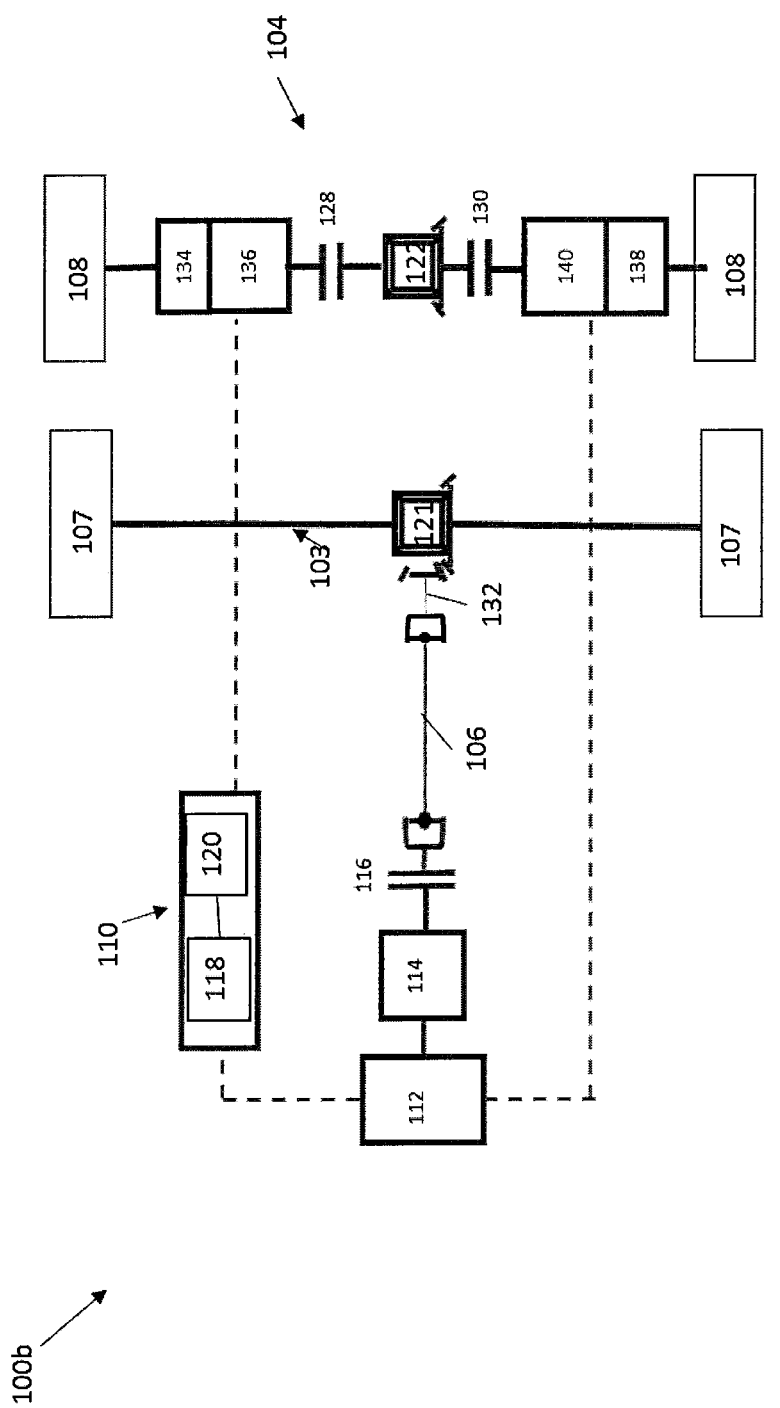

The electric axle drive unit 104 includes a differential assembly 122, a second motor-generator assembly 124, and a third motor-generator assembly 126. In some embodiments, as depicted in FIGS. 1a-1c, the electric drive axle unit 104 further includes a first axle clutch 128 and a second axle clutch 130. The differential assembly 122 is in driving engagement with the primary clutch 116 (through the drive shaft 106), the second motor-generator assembly 124 through the first axle clutch 128, and the third motor-generator assembly 126 through the second axle clutch 130. The second motor-generator assembly 124 is in driving engagement with the differential assembly 122 through the first axle clutch 128 and one of the wheel assemblies 108. The third motor-generator assembly 126 is in driving engagement with the differential assembly 122 through the second axle clutch 130 and a remaining one of the wheel assemblies 108. In some embodiments, the second motor-generator assembly 124 is in electrical communication with the controller 118 and the battery 120. In some embodiments, the third motor-generator assembly 126 is in electrical communication with the controller 118 and the battery 120. In some embodiments, the differential assembly 122 is a common differential gear set implemented to transmit rotational power.

The first axle clutch 128 is a clutch which can be placed in at least an engaged and a disengaged position, such as a dog clutch. Further, it is understood that the first axle clutch 128 may be a clutch that can be variably engaged, such as a plate or cone style clutch. The first axle clutch 128 allows the differential assembly 128 to drivingly engage the second motor-generator assembly 124 when the first axle clutch 128 is at least partially engaged. The first axle clutch 128 is also in communication with the controller 118. In response to communication from the controller 118 to the first axle clutch 128, the first axle clutch 128 is placed in at least an engaged and a disengaged position.

The second axle clutch 130 is a clutch which can placed in at least an engaged and a disengaged position, such as a dog clutch. Further, it is understood that the second axle clutch 130 may be a clutch that can be variably engaged, such as, but not limited to, a plate or cone style clutch. The second axle clutch 130 allows the differential assembly 122 to drivingly engage the third motor-generator assembly 126 when the second axle clutch 130 is at least partially engaged. In some embodiments, the second axle clutch 130 is in communication with the controller 118. In response to communication from the controller 118 to the second axle clutch 130, the second axle clutch 130 is placed in at least an engaged and a disengaged position.

The differential assembly 122 is disposed within an axle housing (not shown). The differential assembly 122 is in driving engagement with an axle drive pinion 132 and the motor-generator assemblies 124, 126. At least one bearing (not shown), which may be a thrust roller bearing, is in contact with a portion of the differential assembly 122 to enable it to rotate within the axle housing. The differential assembly 122 is a conventional differential assembly including a ring gear, differential housing, drive pinions, and side gears as known in the art. The side gears of the differential assembly 122 are respectively drivingly engaged with axle output shafts respectively drivingly engaged with the axle clutches 128, 130. The ring gear of the differential assembly 122 is drivingly engaged with the axle drive pinion 132 to facilitate driving engagement between the first motor-generator 112 and the differential assembly 122 through the gearbox 114, the primary clutch 116, and the drive shaft 106.

The second motor-generator assembly 124 is in driving engagement with a portion of the first axle clutch 128 and one of the wheel assemblies 108. The second motor-generator assembly 124 includes a gearbox portion 134 and a motor-generator portion 136. The gearbox portion 134 is a ratio-adjusting device, such as, but not limited to an epicyclic gearset, a gear train, or a dual speed gearbox used to increase or decrease a drive ratio between the first axle clutch 128 and the wheel assembly 108. More particularly, the gearbox portion 134 is a two-speed or three-speed gearbox.

In some embodiments, the motor-generator portion 136 is in electrical communication with the controller 118 and the battery 120. Depending on an electrical control of the motor-generator portion 136 using the controller 118, the motor-generator portion 136 may apply force to or retard a portion of the first axle clutch 128 and the associated wheel assembly 108. Force is applied by the motor-generator portion 136 by converting electrical energy stored in the battery 120 into kinetic energy by rotating the wheel assembly 108 and any components drivingly engaged therewith. When the portion of the first axle clutch 128 and the associated wheel assembly 108 is retarded in response to electrical control by the controller 118, the motor-generator portion 136 generates electrical energy, which may be stored in the battery 120.

The third motor-generator assembly 126 is in driving engagement with portion of the second axle clutch 130 and a remaining one of the wheel assemblies 108. The third motor-generator assembly 126 includes a gearbox portion 138 and a motor-generator portion 140. The gearbox portion 138 is a ratio-adjusting device, such as but not limited to an epicyclic gearset, a gear train, or a dual speed gearbox used to increase or decrease a drive ratio between the portion of the second axle clutch 130 and the wheel assembly 108. More particularly, the gearbox portion 138 is a two-speed or three-speed gearbox.

In some embodiments, the motor-generator portion 140 is in electrical communication with the controller 118 and the battery 120. Depending on an electrical control of the motor-generator portion 140 using the controller 118, the motor-generator portion 140 may apply force to or retard the portion of the second axle clutch 130 and the associated wheel assembly 108. Force is applied by the motor-generator portion 140 by converting electrical energy stored in the battery 120 into kinetic energy by rotating the wheel assembly 108 and any components drivingly engaged therewith. When the portion of the second axle clutch 130 and the associated wheel assembly 108 is retarded in response to electrical control by the controller 118, the motor-generator portion 140 generates electrical energy, which may be stored in the battery 120.

The battery and control assembly 110 includes the controller 118 and the battery 120. The controller 118 is in electrical communication with the battery 120.

In some embodiments, the controller 118 is in electrical communication with at least the first motor-generator 112, the primary clutch 116, the second motor-generator assembly 124, the third motor-generator assembly 126, and the axle clutches 128, 130. It is understood that the controller 118 may also be in communication with other components of the electric drivetrain 100 or the vehicle (not shown). In some embodiments, the controller 118 and/or the VSC controls an operating mode of the electric drivetrain 100 of the vehicle by placing the primary clutch 116 and the axle clutches 128, 130 in an engaged or disengaged position and by controlling the first motor-generator 112, the second motor-generator assembly 124, and the third motor-generator assembly 126 to apply force to or retard portions of the electric drivetrain 100 that each are respectively drivingly engaged with.

Additionally, in some embodiments, the gearbox portions 134, 138 and clutches 128, 130 may have separate controllers (not shown) in communication with the controller 118 and the VSC. In some embodiments, the separate controllers coordinate engagement of the clutches 128, 130 and/or the VSC controls the engagement of the clutches 128, 130.

In some embodiments, the VSC is configured to manage torque and power of the motor-generators 112, 136, 140 along with controlling the ratio selections of the gearbox portions 134, 138.

In one embodiment, the battery 120 is a rechargeable, electrochemical energy storage device in electrical communication with the controller 118, the first motor-generator 112, the second motor-generator assembly 124, and the third motor-generator assembly 126. It is understood that the battery 120 may also be in electrical communication with other components of the electric drivetrain 100 or the vehicle to supply power thereto. In response to the controller 118 or the VSC adjusting an operating mode of the electric drivetrain 100, the battery 120 may be charged or discharged.

In use, the electric drivetrain 100 may be operated in a plurality of operating modes. The electric drivetrain 100 may be operated in a drive mode, a regeneration/braking mode, and a disconnect mode. Further, it is understood that the operating modes described hereinbelow with respect to the electric drivetrain 100 may be adapted for use with the other electric drivetrains described herein, utilizing the architecture of each to operate in the drive mode, the regeneration/braking mode, and the disconnect mode.

In the drive mode, the primary motor-generator assembly 102, the electric axle drive unit 104, or both the primary motor-generator assembly 102 and the electric axle drive unit 104 apply force to cause rotation of at least one of the wheel assemblies 108 to propel the vehicle incorporating the electric drivetrain 100. When only the primary motor-generator assembly 102 is used in the drive mode, the primary clutch 116 and the axle clutches 128, 130 are placed in an engaged position, and the first motor-generator 112, in response to communication from the controller 118 or VSC, applies force to the electric drivetrain 100 to propel the vehicle. When only the electric axle drive unit 104 is used in the drive mode, the primary clutch 116 is placed in the disengaged position and the axle clutches 128, 130 are placed in an engaged position, and the second motor-generator assembly 124 and the third motor-generator assembly 126, in response to communication from the controller 118 or VSC, apply force to the electric drivetrain 100 to propel the vehicle. When both the primary motor-generator assembly 102 and the electric axle drive unit 104 are used in the drive mode, the primary clutch 116 and the axle clutches 128, 130 are placed in an engaged position, and the first motor-generator 112, the second motor-generator assembly 124, and the third motor-generator assembly 126, in response to communication from the controller 118 or VSC, apply force to the electric drivetrain 100 to propel the vehicle.

In the regeneration/braking mode, the primary motor-generator assembly 102, the electric axle drive unit 104, or both the primary motor-generator assembly 102 and the electric axle drive unit 104 are used to retard the electric drivetrain 100 for the vehicle to facilitate capturing kinetic energy of the vehicle as electrical power to be stored in the battery 120. The regeneration/braking mode may be used to assist a conventional braking system or may be used to regulate a speed of the vehicle when descending an incline. When the primary motor-generator assembly 102 is used in the regeneration/braking mode, the primary clutch 116 and the axle clutches 128, 130 are placed in an engaged position and, and the first motor-generator 112 retards the electric drivetrain 100 to capture kinetic energy as electrical power.

When the electric axle drive unit 104 is used in the regeneration/braking mode, the primary clutch 116 may be placed in a disengaged position and the axle clutches 128, 130 are placed in a disengaged condition, and the electric axle drive unit 104 retards the electric drivetrain 100 to capture kinetic energy as electrical power. When axle clutches 128, 130 are disengaged, the motor-generators 136, 140 are able to supply power to the wheel assemblies 108 or capture kinetic energy from the wheel assemblies 108.

When both the primary motor-generator assembly 102 and the electric axle drive unit 104 are used in the regeneration/braking mode, the primary clutch 116 and the axle clutches 128, 130 are placed in a engaged position, and both the electric axle drive unit 104 and the first motor-generator 112 retard the electric drivetrain 100 to capture kinetic energy as electrical power.

In the disconnect mode, through the use of the axle clutches 128, 130, the electric drivetrain 100 benefits from decreased parasitic losses by being able to disconnect the differential assembly 122 and the drive shaft 106 from the motor-generator assemblies 124, 126. This benefit may occur when the electric drivetrain 100 incorporates two or more electrically driven axles, and only one of the electrically driven axles is used to propel the vehicle such as in tandem axle assemblies.

Further, the electric drivetrain 100 benefits from the ability to disconnect unneeded portions of the electric drivetrain 100, such as when a cruise speed of the vehicle is reached. As a non-limiting example, the primary clutch 116 and the axle clutches 128, 130 may be disengaged to improve efficiency of the electric drivetrain 100 due to the elimination of axle torque losses.

Further, the electric drivetrain 100 provides the benefits of reducing a size of the motor-generators 112, 136, 140 to reduce cost and packaging requirements. The distributed motor-generators 112, 136, 140 provided by the electric drivetrain 100 improve vehicle dynamics and provide for fail-safe operation in the event that one of the motor-generators 112, 136, 140 becomes impaired or non-operational. The electric drivetrain 100 provides the benefits of reducing an amount of unsprung weight due to a reduced weight of the motor-generators 112, 136, 140 when compared to a single mounted on an axle. Lastly, the electric drivetrain 100 provides enhanced versatility, as the electric drivetrain 100 may be used in multiple applications, such as, but not limited to, bus or tractor applications.

An inverter (not shown) is electrically connected to the motor-generators 112, 136, 140 for the purpose of supplying the motor-generators 112, 136, 140 with energy. The battery 120 is electrically connected to the inverter in order to convert a direct current of the battery 120 by means of the inverter into an alternating current for the motor-generator 112, 136, 140.

In another preferred embodiment, as depicted in FIG. 1b, the motor-generator 112 is replaced with an internal combustion engine 112a or other prime mover for use with a hybrid vehicle. In some embodiments, the controller 118 is in electrical communication with at least the primary clutch 116, the second motor-generator assembly 124, the third motor-generator assembly 126, and the axle clutches 128, 130. The battery 120 is a rechargeable, electrochemical energy storage device in electrical communication with the controller 118, the second motor-generator assembly 124, and the third motor-generator assembly 126.

For description purposes, the terms "prime mover", "engine," and like terms, are used herein to indicate a power source. Said power source could be fueled by energy sources including hydrocarbon, electrical, biomass, nuclear, solar, geothermal, hydraulic, pneumatic, and/or wind to name but a few. Although typically described in a vehicle or automotive application, one skilled in the art will recognize the broader applications for this technology and the use of alternative power sources for driving chicle having this technology.

As depicted in FIG. 1c, the electric drive axle unit 104 may be include as an unpowered tag or pusher axle to form a multi-axle driveline for a motor vehicle. In one embodiment, as shown in FIG. 1c, the electric drive axle unit 104 is positioned as a secondary electric axle of a 6×4 tandem axle vehicle. However, in some embodiments, the electric drive axle unit 104 may be positioned as the primary electric axle to form a 6×2 tandem axle vehicle.

Figure 2:
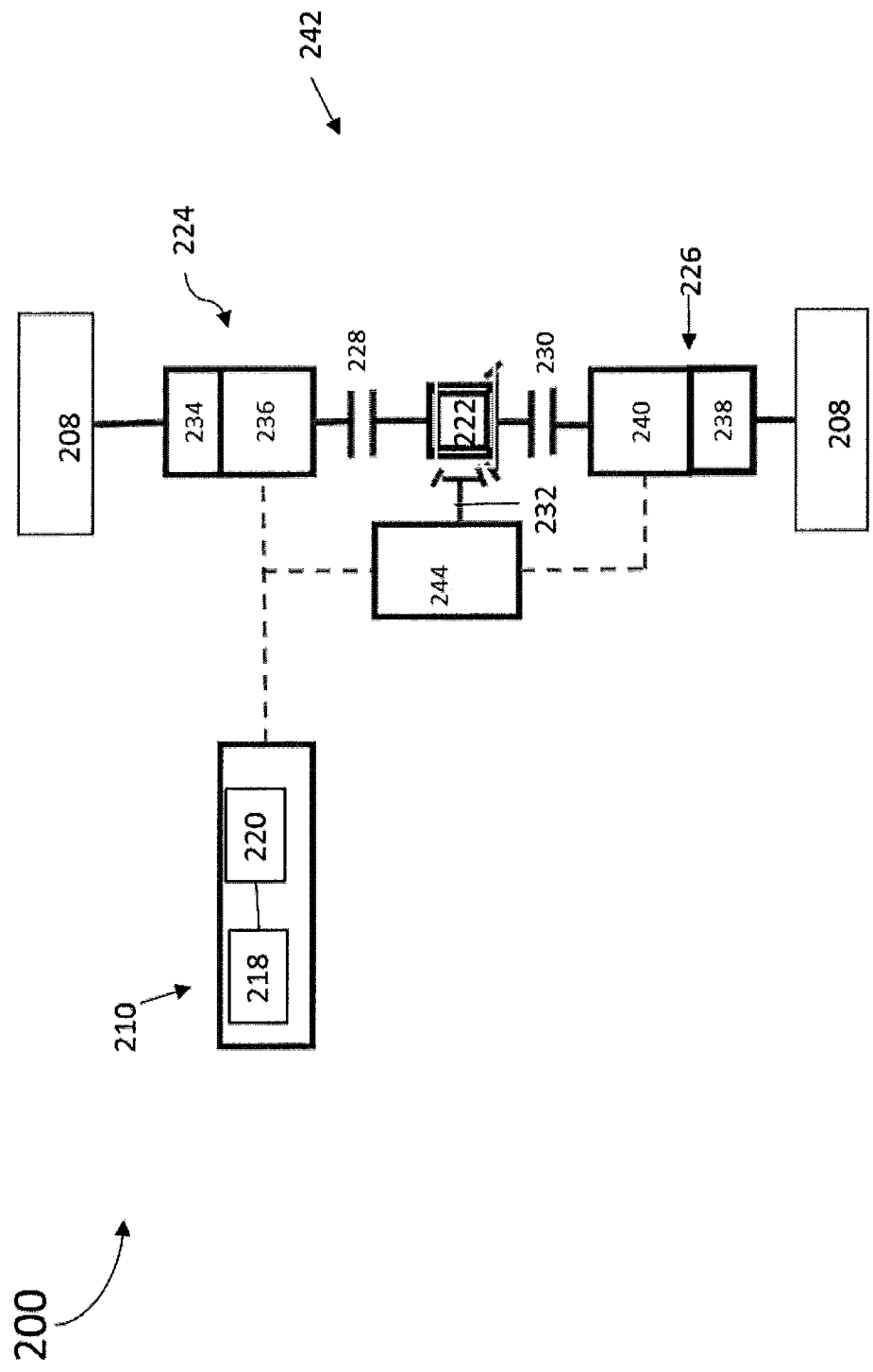
FIG. 2 is a schematic style view of an electric drivetrain according to another preferred embodiment.

FIG. 2 illustrates an electric drivetrain 200 according to another embodiment. The electric drivetrain 200 is a variation of the electric drivetrain 100, and has similar features thereto. The embodiment shown in FIG. 2 includes similar components to the electric drivetrain 100. Similar features of the embodiment shown in FIG. 2 are numbered similarly in series. Different and additional features of the variation shown in FIG. 2 are described hereinbelow and can be appreciated by one skilled in the art in view of FIG. 1 and the other embodiments illustrated and described in this disclosure.

FIG. 2 is a schematic style view of the electric drivetrain 200 for a vehicle (not shown) according to another embodiment. The electric drivetrain 200 includes an electric axle drive unit 242. The electric axle drive unit 242 is drivingly engaged with a pair of wheel assemblies 208. The electric axle drive unit 242 is in electrical communication with a battery and control assembly 210. The electric drivetrain 200 as shown is a battery electric vehicle drivetrain, and may be operated in a plurality of operating modes, as described hereinabove. While not shown, it is understood that the electric drivetrain 200 may be operated with an unpowered tag or pusher axle to form a multi-axle driveline.

The electric axle drive unit 242 includes a first motor-generator 244, a differential assembly 222, a second motor-generator assembly 224, a third motor-generator assembly 226, a first axle clutch 228, and a second axle clutch 230. The differential assembly 222 is in driving engagement with the first motor-generator 244, the second motor-generator assembly 224 through the first axle clutch 228, and the third motor-generator assembly 226 through the second axle clutch 230. The second motor-generator assembly 224 is in driving engagement with the differential assembly 222 through the first axle clutch 228 and one of the wheel assemblies 208. The third motor-generator assembly 226 is in driving engagement with the differential assembly 222 through the second axle clutch 230 and a remaining one of the wheel assemblies 208. In some embodiments, the second motor-generator assembly 224 is in electrical communication with the controller 218 and the battery 220. The third motor-generator assembly 226 is in electrical communication with the controller 218 and the battery 220.

The first motor-generator 244 is in driving engagement with the differential assembly 222. The first motor-generator 244 may be coupled to an axle housing (not shown). In some embodiments, the first motor-generator 244 is in electrical communication with the battery and control assembly 210. Depending on an electrical control of the first motor-generator 244 using the battery and control assembly 210, the first motor-generator 244 may apply force to or retard the differential assembly 222 and any other drivetrain components drivingly engaged therewith. Force is applied by the first motor-generator 244 by converting electrical energy stored in a battery 220 into kinetic energy by driving the differential assembly 222 and any components drivingly engaged therewith. When the differential assembly 222 is retarded in response to electrical control by a controller 218 or VSC, the first motor-generator 244 generates electrical energy, which may be stored in the battery 220.

Figure 3:
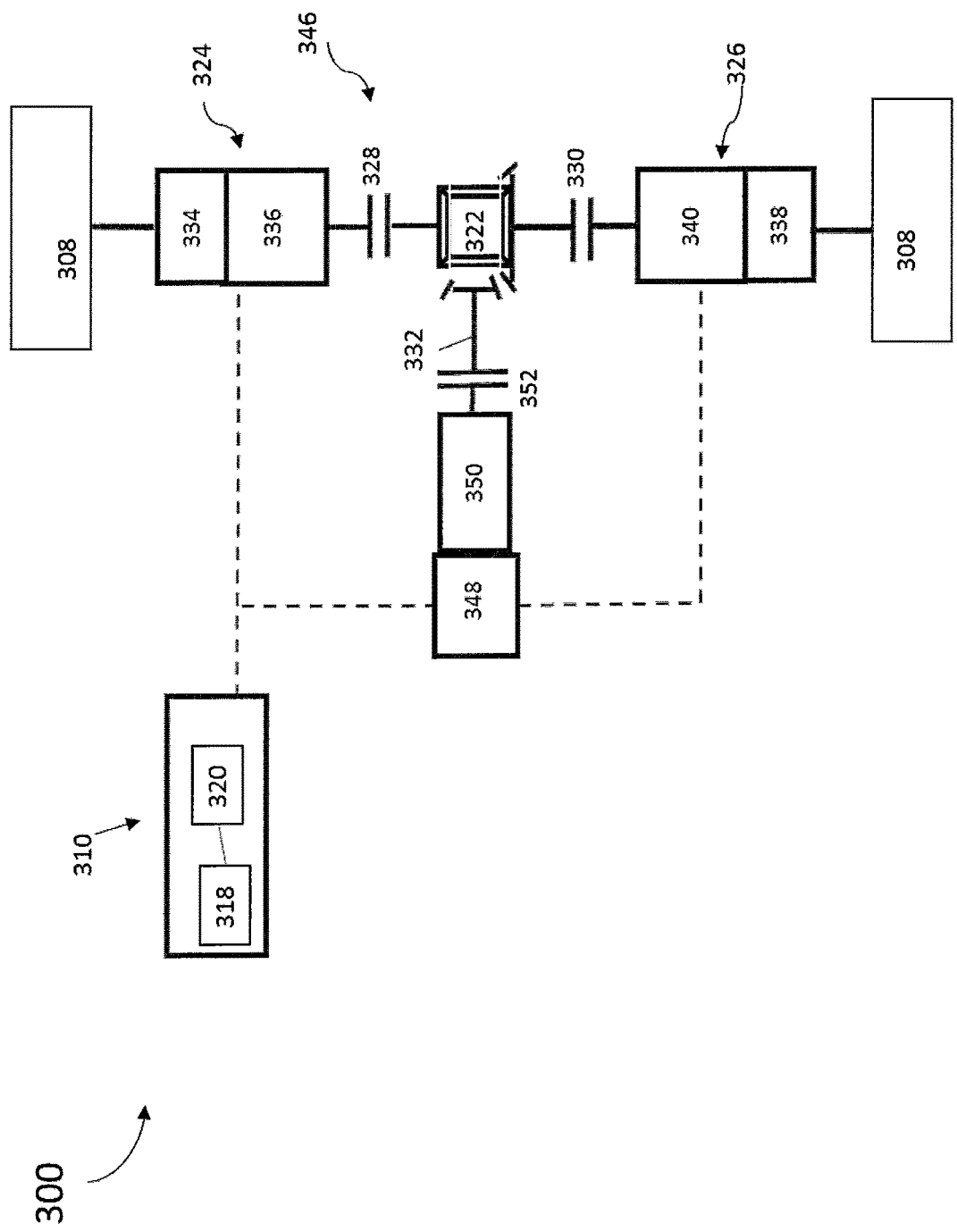
FIG. 3 is a schematic style view of an electric drivetrain according to another preferred embodiment.

FIG. 3 illustrates an electric drivetrain 300 according to another embodiment. The electric drivetrain 300 is a variation of the electric drivetrain 100, and has similar features thereto. The embodiment shown in FIG. 3 includes similar components to the electric drivetrain 100. Similar features of the variation shown in FIG. 3 are numbered similarly in series. Different and additional features of the variation shown in FIG. 3 are described hereinbelow and can be appreciated by one skilled in the art in view of FIG. 1 and the other embodiments illustrated and described in this disclosure.

FIG. 3 is a schematic style view of the electric drivetrain 300 for a vehicle (not shown) according to another embodiment. The electric drivetrain 300 includes an electric axle drive unit 346. The electric axle drive unit 346 is drivingly engaged with a pair of wheel assemblies 308. The electric axle drive unit 346 is in electrical communication with a battery and control assembly 310. The electric drivetrain 300 as shown is a battery electric vehicle drivetrain, and may be operated in a plurality of operating modes, as described hereinabove. While not shown, it is understood that the electric drivetrain 300 may be operated with an unpowered tag or pusher axle to form a multi-axle driveline.

The electric axle drive unit 346 includes a first motor-generator 348, a gearbox 350, a primary clutch 352, a differential assembly 322, a second motor-generator assembly 324, a third motor-generator assembly 326, a first axle clutch 328, and a second axle clutch 330. The gearbox 350 is drivingly engaged with the first motor-generator 348 and the primary clutch 352. The differential assembly 322 is in driving engagement with the primary clutch 352, the second motor-generator assembly 324 through the first axle clutch 328, and the third motor-generator assembly 326 through the second axle clutch 330. The second motor-generator assembly 324 is in driving engagement with the differential assembly 322 through the first axle clutch 328 and one of the wheel assemblies 308. The third motor-generator assembly 326 is in driving engagement with the differential assembly 322 through the second axle clutch 330 and a remaining one of the wheel assemblies 308. In some embodiments, the second motor-generator assembly 324 is in electrical communication with the controller 318 and the battery 320. The third motor-generator assembly 326 is in electrical communication with the controller 318 and the battery 320.

The first motor-generator 348 is in driving engagement with the gearbox 350. The first motor-generator 348 may be coupled to an axle housing (not shown). In some embodiments, the first motor-generator 348 is in electrical communication with the battery and control assembly 310. Depending on an electrical control of the first motor-generator 348 using the battery and control assembly 310, the first motor-generator 348 may apply force to or retard the gearbox 350 and any other drivetrain components drivingly engaged therewith. Force is applied by the first motor-generator 348 by converting electrical energy stored in a battery 320 into kinetic energy by driving the gearbox 350 and any components drivingly engaged therewith. When the gearbox 350 is retarded in response to electrical control by a controller 318 or VSC, the first motor-generator 348 generates electrical energy, which may be stored in the battery 320.

The gearbox 350 is a drive ratio-adjusting device including an assembly of gears, clutches, actuators and other components typically used in transmissions. As a non-limiting example, the gearbox 350 may be a fixed ratio gearbox and may provide a plurality of drive ratios to facilitate an operation of the first motor-generator 348 across a greater number of speed and torque requirements of the electric axle drive unit 346. The gearbox 350 is drivingly engaged with the first motor-generator 348 and a portion of the primary clutch 352. The gearbox 350 is in communication with the controller 318 and/or VSC. In response to communication from the controller 318 or VSC, a drive ratio of the gearbox 350 is adjusted.

The primary clutch 352 is a clutch which can be variably engaged, such as a plate or cone style clutch. The primary clutch 352 allows the first motor-generator 348 to drivingly engage the electric axle drive unit 346 through the gearbox 350 when the primary clutch 352 is at least partially engaged. The primary clutch 352 is also in communication with the controller 318 and/or VSC. In response to communication from the controller 318 or VSC to the primary clutch 352, the primary clutch 352 is placed in a disengaged, partially engaged, or engaged position.

Figure 4:
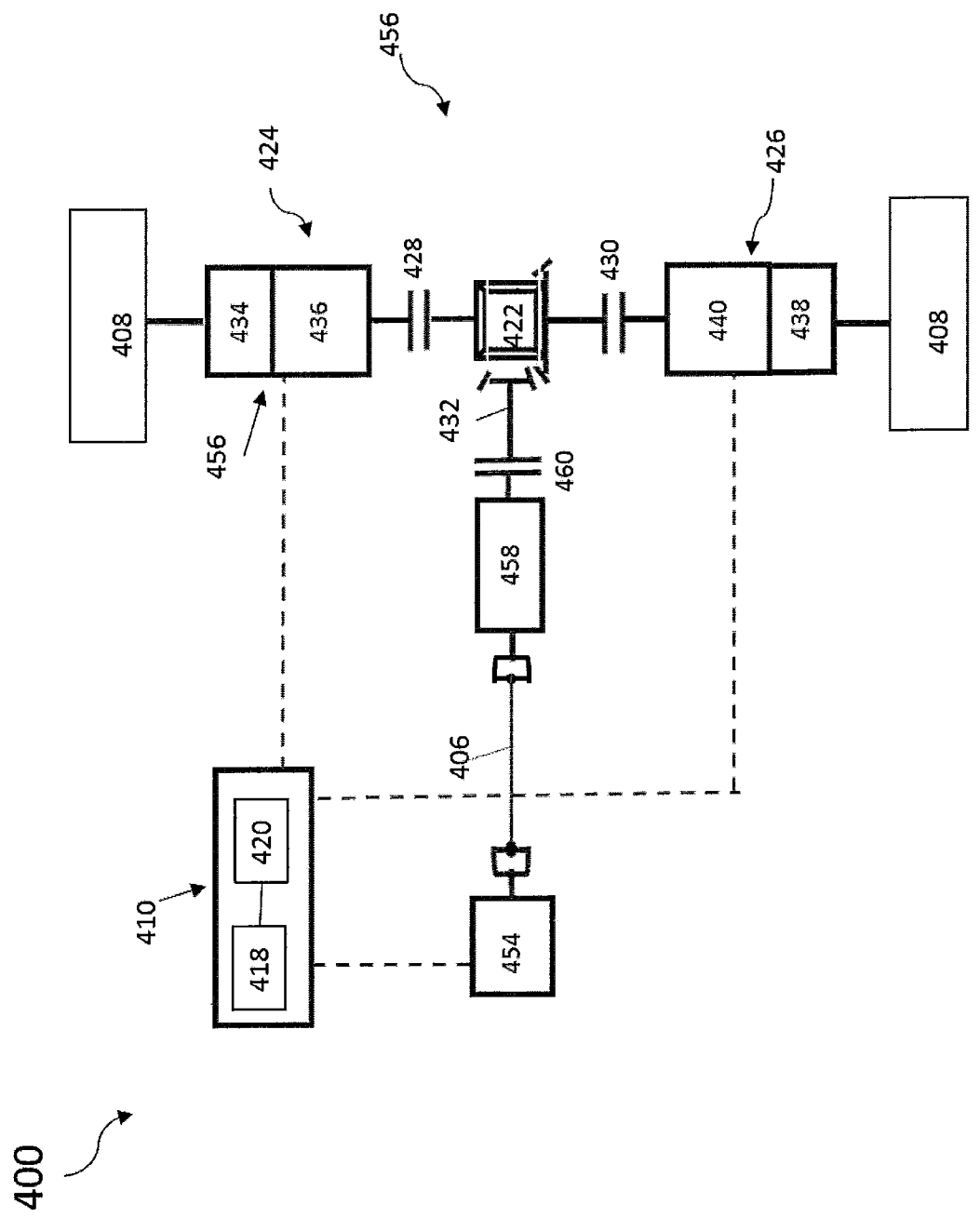
FIG. 4 is a schematic style view of an electric drivetrain according to another preferred embodiment.

FIG. 4 illustrates an electric drivetrain 400 according to another embodiment. The electric drivetrain 400 is a variation of the electric drivetrain 100, and has similar features thereto. The embodiment shown in FIG. 4 includes similar components to the electric drivetrain 100. Similar features of the variation shown in FIG. 4 are numbered similarly in series. Different and additional features of the variation shown in FIG. 4 are described hereinbelow and can be appreciated by one skilled in the art in view of FIG. 1 and the other embodiments illustrated and described in this disclosure.

FIG. 4 is a schematic style view of the electric drivetrain 400 for a vehicle (not shown) according to another embodiment. The electric drivetrain 400 includes a first motor-generator 454 and an electric axle drive unit 456. The electric axle drive unit 456 is drivingly engaged with a pair of wheel assemblies 408. In some embodiments, the electric axle drive unit 456 is in electrical communication with a battery and control assembly 410. The electric drivetrain 400 as shown is a battery electric vehicle drivetrain, and may be operated in a plurality of operating modes, as described hereinabove. While not shown, it is understood that the electric drivetrain 400 may be operated with an unpowered tag or pusher axle to form a multi-axle driveline.

The first motor-generator 454 is in driving engagement with the electric axle drive unit 456 through the drive shaft 406, and is remotely mounted from the electric axle drive unit 456. The first motor-generator 454 is in electrical communication with the battery and control assembly 410. Depending on an electrical control of the first motor-generator 454 using the battery and control assembly 410, the first motor-generator 454 may apply force to or retard the electric axle drive unit 456 and any other drivetrain components drivingly engaged therewith. Force is applied by the first motor-generator 454 by converting electrical energy stored in a battery 420 into kinetic energy by rotating an input of the electric axle drive unit 456 and any components drivingly engaged therewith. When the input of the electric axle drive unit 456 is retarded in response to electrical control by a controller 418 or VSC, the first motor-generator 454 generates electrical energy, which may be stored in the battery 420.

The electric axle drive unit 456 includes a gearbox 458, a primary clutch 460, a differential assembly 422, a second motor-generator assembly 424, a third motor-generator assembly 426, a first axle clutch 428, and a second axle clutch 430. The gearbox 458 is drivingly engaged with the first motor-generator 454 through the drive shaft 406 and the primary clutch 460. The differential assembly 422 is in driving engagement with the primary clutch 460, the second motor-generator assembly 424 through the first axle clutch 428, and the third motor-generator assembly 426 through the second axle clutch 430. The second motor-generator assembly 424 is in driving engagement with the differential assembly 422 through the first axle clutch 428 and one of the wheel assemblies 408. The third motor-generator assembly 426 is in driving engagement with the differential assembly 422 through the second axle clutch 430 and a remaining one of the wheel assemblies 408. In some embodiments, the second motor-generator assembly 424 is in electrical communication with the controller 418 and the battery 420. The third motor-generator assembly 426 is in electrical communication with the controller 418 and the battery 420.

The gearbox 458 is a drive ratio adjusting device disposed in a housing (not shown) of the electric axle drive unit 456 including an assembly of gears, clutches, actuators and other components typically used in transmissions. As a non-limiting example, the gearbox 458 may be a fixed ratio gearbox and may provide a plurality of drive ratios to facilitate an operation of the first motor-generator 454 across a greater number of speed and torque requirements of the electric axle drive unit 456. The gearbox 458 is drivingly engaged with the first motor-generator 454 and a portion of the primary clutch 460. The gearbox 458 is in communication with the controller 418 and/or VSC. In response to communication from the controller 418 or VSC, a drive ratio of the gearbox 458 is adjusted.

The primary clutch 460 is a clutch disposed in a housing (not shown) of the electric axle drive unit 456 which can be variably engaged, such as a plate or cone style clutch. The primary clutch 460 allows the gearbox 458 to drivingly engage the differential assembly 422 when the primary clutch 460 is at least partially engaged. The primary clutch 460 is also in communication with the controller 418 and/or VSC. In response to communication from the controller 418 or VSC to the primary clutch 460, the primary clutch 460 is placed in a disengaged, partially engaged, or engaged position.

Figure 5:
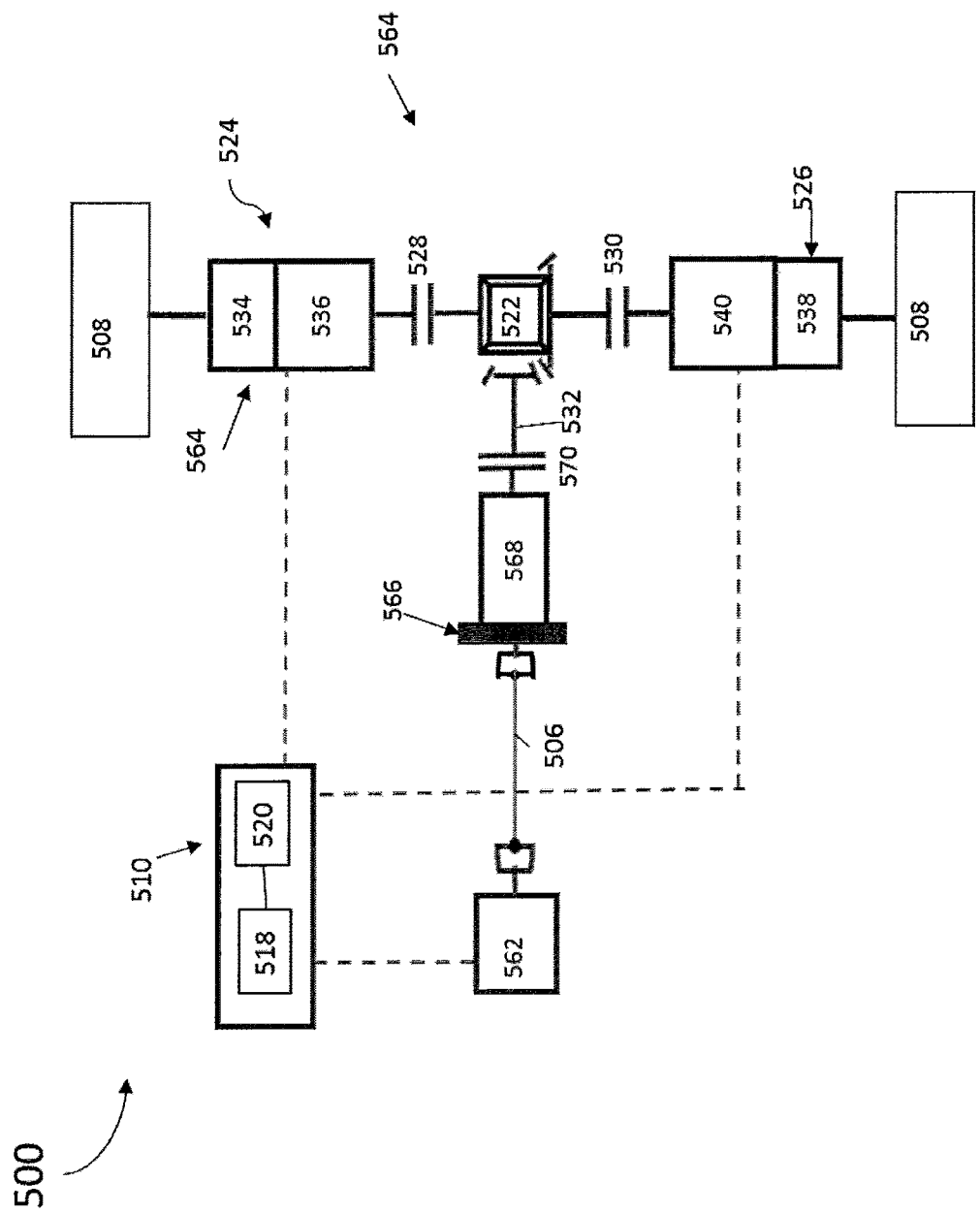
FIG. 5 is a schematic style view of an electric drivetrain according to another preferred embodiment.

FIG. 5 illustrates an electric drivetrain 500 according to another preferred embodiment. The electric drivetrain 500 is a variation of the electric drivetrain 100, and has similar features thereto. The embodiment shown in FIG. 5 includes similar components to the electric drivetrain 100. Similar features of the variation shown in FIG. 5 are numbered similarly in series. Different and additional features of the variation shown in FIG. 5 are described hereinbelow and can be appreciated by one skilled in the art in view of FIG. 1 and the other embodiments illustrated and described in this disclosure.

FIG. 5 is a schematic style view of the electric drivetrain 500 for a vehicle (not shown) according to another preferred embodiment. The electric drivetrain 500 includes a first motor-generator 562 and an electric axle drive unit 564. The electric axle drive unit 564 is drivingly engaged with a pair of wheel assemblies 508. The electric axle drive unit 564 is in electrical communication with a battery and control assembly 510. The electric drivetrain 500 as shown is a battery electric vehicle drivetrain, and may be operated in a plurality of operating modes, as described hereinabove. While not shown, it is understood that the electric drivetrain 500 may be operated with an unpowered tag or pusher axle to form a multi-axle driveline.

The first motor-generator 562 is in driving engagement with the electric axle drive unit 564 through the drive shaft 506, and is remotely mounted from the electric axle drive unit 564. The first motor-generator 562 is in electrical communication with the battery and control assembly 510. Depending on an electrical control of the first motor-generator 562 using the battery and control assembly 510, the first motor-generator 562 may apply force to or retard the electric axle drive unit 564 and any other drivetrain components drivingly engaged therewith. Force is applied by the first motor-generator 562 by converting electrical energy stored in a battery 520 into kinetic energy by rotating an input of the electric axle drive unit 564 and any components drivingly engaged therewith. When the input of the electric axle drive unit 564 is retarded in response to electrical control by a controller 518 or VSC, the first motor-generator 562 generates electrical energy, which may be stored in the battery 520.

The electric axle drive unit 564 includes a kinetic energy recovery system 566, a gearbox 568, a primary clutch 570, a differential assembly 522, a second motor-generator assembly 524, a third motor-generator assembly 526, a first axle clutch 528, and a second axle clutch 530. The kinetic energy recovery system 566 is drivingly engaged with the first motor-generator through the drive shaft 506 and the gearbox 568. The gearbox 568 is drivingly engaged with the primary clutch 570. The differential assembly 522 is in driving engagement with the primary clutch 570, the second motor-generator assembly 524 through the first axle clutch 528, and the third motor-generator assembly 526 through the second axle clutch 530. The second motor-generator assembly 524 is in driving engagement with the differential assembly 522 through the first axle clutch 528 and one of the wheel assemblies 508. The third motor-generator assembly 526 is in driving engagement with the differential assembly 522 through the second axle clutch 530 and a remaining one of the wheel assemblies 508. The second motor-generator assembly 524 is in electrical communication with the controller 518 and/or VSC and the battery 520. The third motor-generator assembly 526 is in electrical communication with the controller 518 and/or VSC and the battery 520.

The kinetic energy recovery system 566 is disposed in a housing (not shown) of the electric axle drive unit 564 and stores and applies energy present in the electric drivetrain 500. The kinetic energy recovery system 566 may be a flywheel type kinetic energy recovery system, wherein kinetic energy is captured during a braking operation, for example, and stored in a flywheel. Further, when the electric driveline 500 requires additional output, such as for an acceleration or launching event, energy stored in the flywheel is applied to the electric driveline 500. As shown in FIG. 5, the kinetic energy recovery system 566 is drivingly engaged with the gearbox 568 and the first motor-generator 562 through the drive shaft 506. The kinetic energy recovery system 566 is in communication with the controller 518 and/or VSC, which commands the kinetic energy recovery system 566 to store and releases energy into the electric driveline 500 based on, for example, a state of charge of the battery 520 or a mode of operation of the electric driveline 500.

The gearbox 568 is a drive ratio adjusting device disposed in a housing (not shown) of the electric axle drive unit 564 including an assembly of gears, clutches, actuators and other components typically used in transmissions. As a non-limiting example, the gearbox 568 may be a fixed ratio gearbox and may provide a plurality of drive ratios to facilitate an operation of the first motor-generator 562 across a greater number of speed and torque requirements of the electric axle drive unit 564. The gearbox 568 is drivingly engaged with the kinetic energy recovery system 566 and a portion of the primary clutch 570. The gearbox 568 is in communication with the controller 518 and/or VSC. In response to communication from the controller 518 or VSC, a drive ratio of the gearbox 568 is adjusted.

The primary clutch 570 is a clutch disposed in a housing (not shown) of the electric axle drive unit 564 which can be variably engaged, such as a plate or cone style clutch. The primary clutch 570 allows the gearbox 568 to drivingly engage the differential assembly 522 when the primary clutch 570 is at least partially engaged. The primary clutch 570 is also in communication with the controller 518 and/or VSC. In response to communication from the controller 518 or VSC to the primary clutch 570, the primary clutch 570 is placed in a disengaged, partially engaged, or engaged position.

Figure 6:
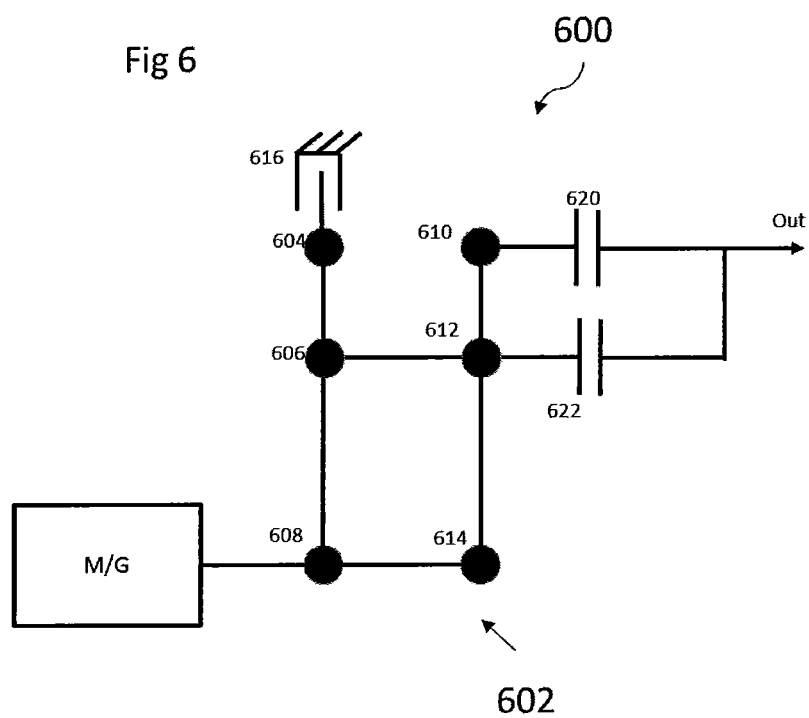
FIG. 6 is a schematic style view of a gearbox according to a preferred embodiment.

In some embodiments, as depicted in FIG. 6, the gearbox portions 134, 138, 234, 238, 334, 338, 434, 438, 534, 538 are two-speed planetary gearboxes 600. The motor-generator 136, 140, 236, 240, 336, 340, 436, 440, 536, 540 is drivingly connected to a planetary gear set 602. The planetary gear set 602 is provided with a first ring gear 604, a first planet carrier 606, a first sun gear 608, a second ring gear 610, a second planet carrier 612 and a second sun gear 614. In some embodiments, the first sun gear 608 is coupled to the motor-generator 136, 140, 236, 240, 336, 340, 436, 440, 536, 540, the first planet carrier 606 and the second sun gear 614. The first planet carrier 606 is coupled to the first ring gear 604 and the second planet carrier 612. The first ring gear 604 is grounded through a brake 616. The second ring gear 610 is operably coupled to a first clutch 620 and the second planet carrier 612 is operably coupled to a second clutch 622. The first and second clutches 620, 622 are selectively engaged to couple the second ring gear 610 and the second planet carrier 613 to an output that is drivingly engaged with a wheel assembly 108, 208, 308, 408, 508.

During operation of the gearbox 600, the brake 616 is engaged at all times. The gearbox 600 provides two modes of operation. When the first clutch 620 is engaged and the second clutch 622 is disengaged, the gearbox 606 operates in a first mode providing a low speed gear ratio. When the first clutch 620 is disengaged and the second clutch 622 is engaged, the gearbox 600 operates in a second mode providing a high speed gear ratio. The first and second clutches 620, 622 are activated using an actuation device including, but not limited to, an electromagnetic or pneumatic actuator.

Figure 7:
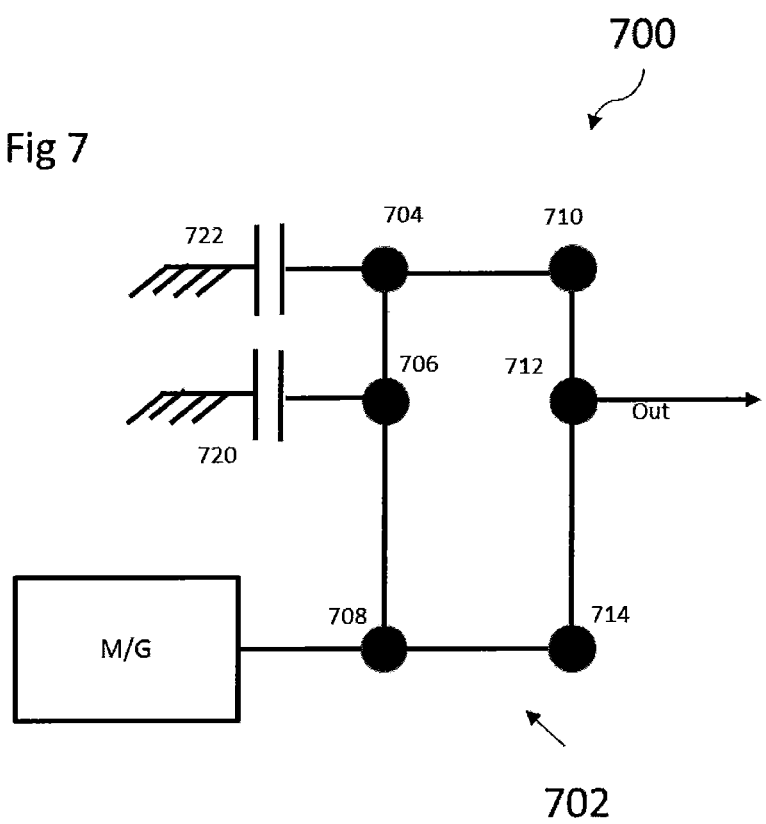
FIG. 7 is a schematic style view of a gearbox according to another preferred embodiment.

In some embodiments, as depicted in FIG. 7, the gearbox portions 134, 138, 234, 238, 334, 338, 434, 438, 534, 538 are two-speed planetary gearboxes 700. The motor-generator 136, 140, 236, 240, 336, 340, 436, 440, 536, 540 is drivingly connected to a planetary gear set 702. The planetary gear set 702 is provided with a first ring gear 704, a first planet carrier 706, a first sun gear 708, a second ring gear 710, a second planet carrier 712 and a second sun gear 714. In some embodiments, the first sun gear 708 is coupled to the motor-generator 136, 140, 236, 240, 336, 340, 436, 440, 536, 540, the first planet carrier 706 and the second sun gear 714. The first planet carrier 706 is coupled to the first ring gear 704 and a first clutch 720. The first clutch 720 selectively grounds the first planet carrier 706. The first ring gear 704 is coupled to a second clutch 722 and the second ring gear 710. The second clutch 722 selectively grounds the first ring gear 704. The second ring gear 710 is coupled to the second planet carrier 712. The second planet carrier 712 is coupled to an output that is drivingly engaged with a wheel assembly 108, 208, 308, 408, 508.

During operation, the gearbox 700 provides two modes of operation. When the first clutch 720 is engaged and the second clutch 722 is disengaged, the gearbox 700 operates in a first mode providing a low speed gear ratio. When the first clutch 720 is disengaged and the second clutch 722 is engaged, the gearbox operates in a second mode providing a high speed gear ratio. The first and second clutches 720, 722 are activated using an actuation device including, but not limited to, an electromagnetic or pneumatic actuator.

Figure 8:
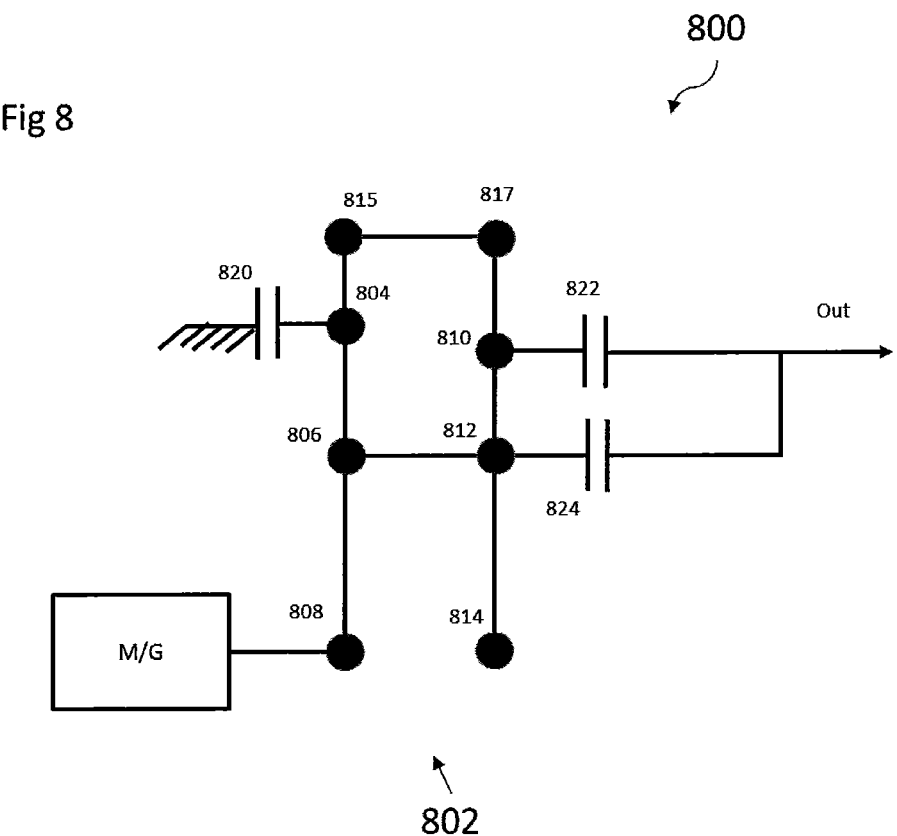
FIG. 8 is a schematic style view of a gearbox according to another preferred embodiment.

In some embodiments, as depicted in FIG. 8, the gearbox portions 134, 138, 234, 238, 334, 338, 434, 438, 534, 538 are two-speed stepped pinion planetary gearbox 800. The motor-generator 136, 140, 236, 240, 336, 340, 436, 440, 536, 540 is drivingly connected to a planetary gear set 802. The planetary gear set 802 is provided with a first ring gear 804, a first planet carrier 806, a first sun gear 808, a second ring gear 810, a second planet carrier 812, a second sun gear 814, a first pinion gear 815 and a second pinion gear 817. The first pinion gear 815 and second pinion gear from a stepped pinion gear. In some embodiments, the first sun gear 808 is coupled to the motor-generator 136, 140, 236, 240, 336, 340, 436, 440, 536, 540 and the first planet carrier 806. The first planet carrier 806 is coupled to the first ring gear 804 and the second planet carrier 812. The first ring gear 804 is coupled to a first clutch 822 and the first pinion gear 815. The first pinion gear 815 is coupled to the second pinion gear 817 which is coupled to the second ring gear 810. The second ring gear 810 is coupled to the second planet carrier 812 and selectively coupled to an output through a second clutch 822. The second planet carrier 812 is selectively coupled to the output through a third clutch 824. The first clutch 820 selectively grounds the first ring gear 804. The output is drivingly engaged to a wheel assembly 108, 208, 308, 408, 508.

During operation of the gearbox 800 provides two modes of operation. When the second clutch 822 is engaged and the third clutch 824 is disengaged, the gearbox 800 operates in a first mode providing a low speed gear ratio. When the second clutch 822 is disengaged and the third clutch 824 is engaged, the gearbox 800 operates in a second mode providing a high speed gear ratio. The clutches 820, 822, 824 are activated by using an actuation device including, but not limited to, an electromagnetic or pneumatic actuator.

Figure 9B:
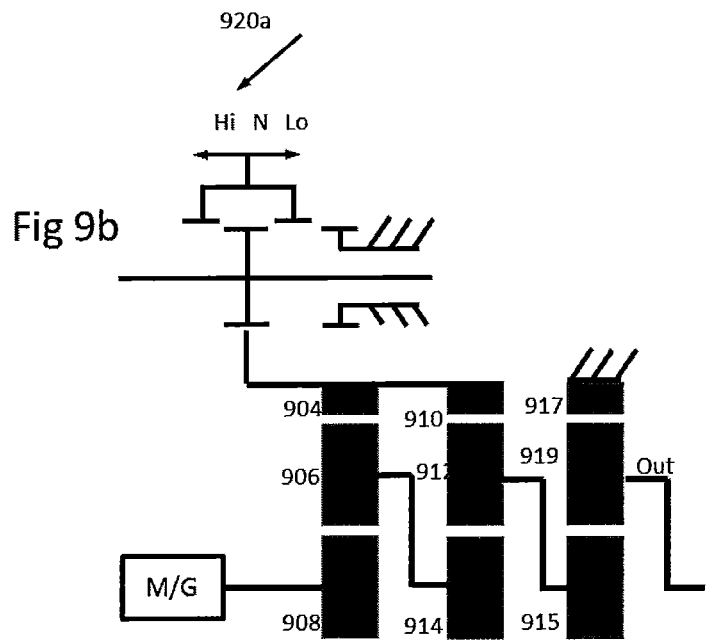
Figure 9A:
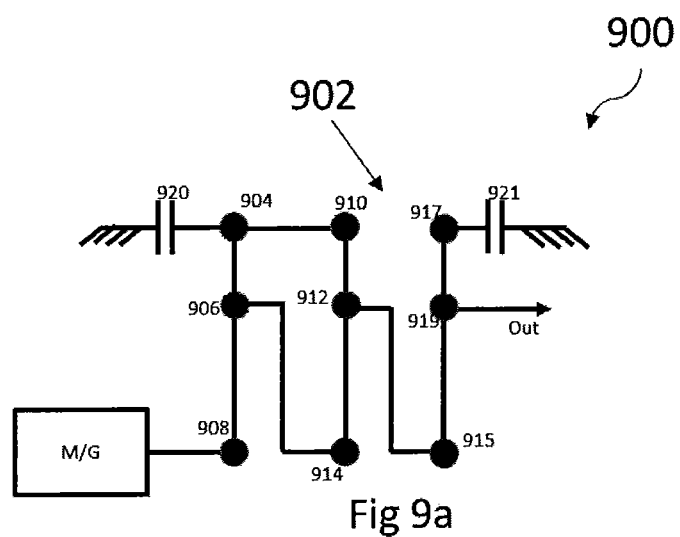
FIG. 9a is a schematic style view of a gearbox according to another preferred embodiment.

In some embodiments, as depicted in FIGS. 9a-9b, the gearbox portions 134, 138, 234, 238, 334, 338, 434, 438, 534, 538 are three-speed planetary gearbox 900. The motor-generator 136, 140, 236, 240, 336, 340, 436, 440, 536, 540 is drivingly connected to a planetary gear set 902. The planetary gear set 902 is provided with a first ring gear 904, a first planet carrier 906, a first sun gear 908, a second ring gear 910, a second planet carrier 912, a second sun gear 914, a third sun gear 915, a third ring gear 917, and a third planet carrier 919. In some embodiments, the first sun gear 908 is coupled to the motor-generator 136, 140, 236, 240, 336, 340, 436, 440, 536, 540 and the first planet carrier 906. The first planet carrier 906 is coupled to the first ring gear 904 and the second sun gear 914. The first ring gear 904 is coupled to a first clutch 920 and the second ring gear 910 which is coupled to the second planet carrier 912. The second planet carrier 912 is coupled to the third sun gear 915 which is coupled to the third planet carrier 919. The third planet carrier 919 is coupled to the third ring gear 917 and an output of the gearbox 900. The third ring gear is selectively grounded by a brake 921. The first clutch 920 selectively grounds the first ring gear 904. In further embodiments, the first clutch 920 is a selector clutch configured to select three modes of operation. The output is drivingly engaged to a wheel assembly 108, 208, 308, 408, 508.

During operation of the gearbox 900 provides three modes of operation depending on the position of the first clutch 920. When the first clutch 920 is engaged with the planetary gear set 902 the gearbox 906 operates in a high speed gear ratio. When the first clutch 920 is in a neutral or disengaged mode, gearbox 900 operates in a neutral or direct drive mode. When the first clutch 920 selectively grounds the first ring gear 904 it provides a low-speed gear ratio operational mode. The clutch 920 is activated by using an actuation device including, but not limited to, an electromagnetic or pneumatic actuator.

In some embodiments, as depicted in FIG. 10, the gearbox portions 134, 138, 234, 238, 334, 338, 434, 438, 534, 538 includes a gearbox having a two-speed layshaft gear arrangement 1002. The motor-generator 136, 140, 236, 240, 336, 340, 436, 440, 536, 540 is drivingly connected to an output shaft 1002. The two-speed layshaft gear arrangement 1002 includes a set of gear passes 1004, 1006, 1008 rotatably connected to the output shaft 1002 and a rotatable layshaft 1010. A portion of the first gear pass 1004 is rotatably connected to the output shaft 1002 and a portion is rotatably connected to the layshaft 1010. A selector clutch 1012 is positioned on the output shaft 1002 between the first gear pass 1004 and a second gear pass 1006. The second gear pass 1002 has a portion drivingly connected to the output shaft 1002 and a portion rotatably connected to the layshaft 1010. Further, a third gear pass 1006 has a portion rotatably connected to the output shaft 1002 and a portion rotatably connected to the layshaft 1010. In some embodiments, the layshaft 1010 is a hollow rotatable shaft that is parallel to the output shaft 1002.

During operation of the gearbox 1000, the selector clutch 1012 selectively connects the first gear pass 1004 and second gear pass 1006 to the layshaft 1010. When the selector clutch 1012 drivingly connects the first gear pass 1004 with the layshaft 1010, the gearbox 1000 operates in a low speed gear ratio. When the selector clutch 1012 drivingly connects the second gear pass 1006 with the layshaft 1010, the gearbox 1000 operates in a high speed gear ratio. The clutch 1012 can be activated by using an actuation device including, but not limited to, an electromagnetic or pneumatic actuator. The layshaft 1010 is drivingly connected to the wheel assemblies 108, 208, 308, 408, 508. In further embodiments, the gearbox 1000 can include additional layshafts with additional gear passes and additional selector clutches to increase the number of gear ratio which the gearbox 1000 can provide.

Figure 11A:
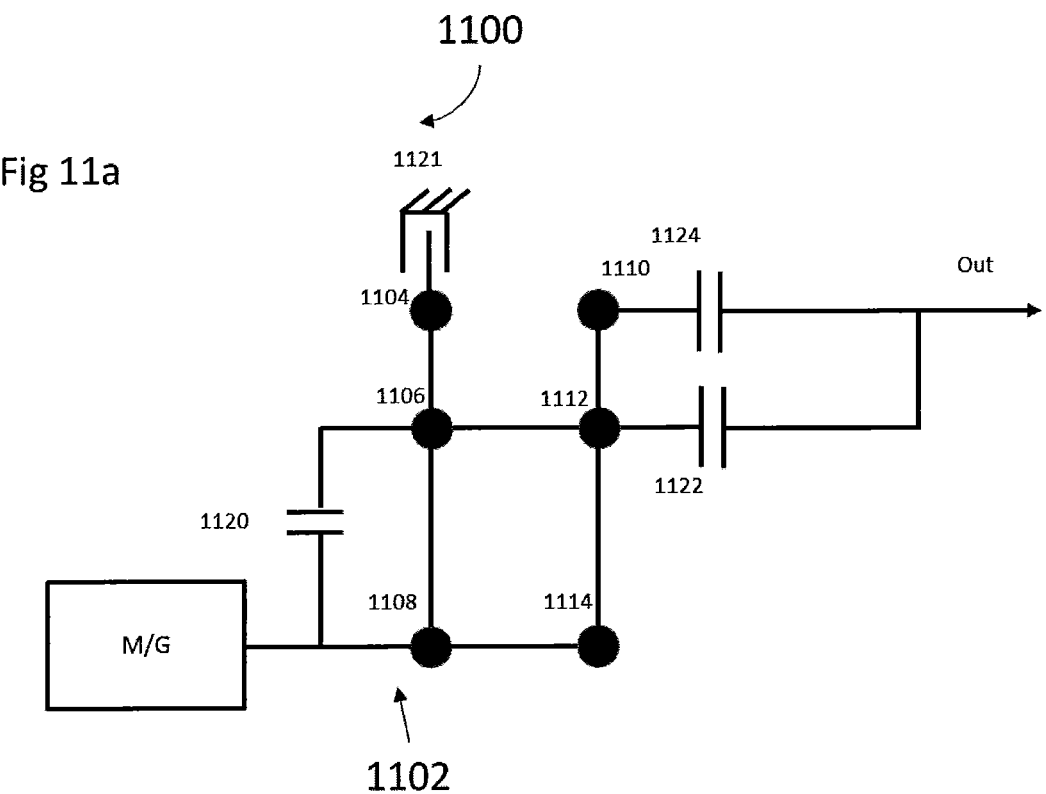
FIGS. 11a-11b are schematic style views of a gearbox according to another preferred embodiment.

In some embodiments, as depicted in FIG. 11a, the gearbox portions 134, 138, 234, 238, 334, 338, 434, 438, 534, 538 are three-speed planetary gearbox 1100. The motor-generator 136, 140, 236, 240, 336, 340, 436, 440, 536, 540 is drivingly connected to a planetary gear set 1102. The planetary gear set 1102 is provided with a first ring gear 1104, a first planet carrier 1106, a first sun gear 1108, a second ring gear 1110, a second planet carrier 1112, and a second sun gear 1114. In some embodiments, the first sun gear 1108 is coupled to the motor-generator 136, 140, 236, 240, 336, 340, 436, 440, 536, 540, the first planet carrier 1106 and the second sun gear 1114. The first planet carrier 1106 is coupled to the first ring gear 1104, the second planet carrier 1112 and a first clutch 1120. The first clutch 1120 selectively couples the output of the motor-generator 136, 140, 236, 240, 336, 340, 436, 440, 536, 540 to the first planet carrier 1106. The first ring gear 1104 is coupled to a brake 1121 that selectively grounds the first ring gear 1104. The second planet carrier 1112 is coupled to the second sun gear 1114, the second ring gear 1110 and is selectively coupled to an output through a second clutch 1122. The second ring gear 1110 is selectively coupled to the output through a third clutch 1124. The output is drivingly engaged to a wheel assembly 108, 208, 308, 408, 508.

During operation of the gearbox 1100 provides three modes of operation depending on the position of the engagement of the clutches 1120, 1122, 1124. When the first clutch 1120 is engaged and the motor-generator 136, 140, 236, 240, 336, 340, 436, 440, 536, 540 is drivingly connected to the first planet carrier 1106 and the first sun gear 1108 operates in a neutral mode. If the brake 1121, second clutch 1122 and third clutch 1124 are disengaged then the gearbox 1100 operates in a direct drive mode. When the first clutch 1120 and the second clutch 1122 are disengaged and the brake 1121 and third clutch 1124 are engaged, the gearbox 1100 operates in a high-speed gear ratio operational mode. When the first clutch 1120 and the third clutch 1124 are disengaged and the brake 1121 and second clutch 1122 are engaged, the gearbox 1100 operates in a low-speed gear ratio operational mode. The clutches 1120, 1122, 1124 are activated using an actuation device including, but not limited to, an electromagnetic or pneumatic actuator.

Figure 11B:
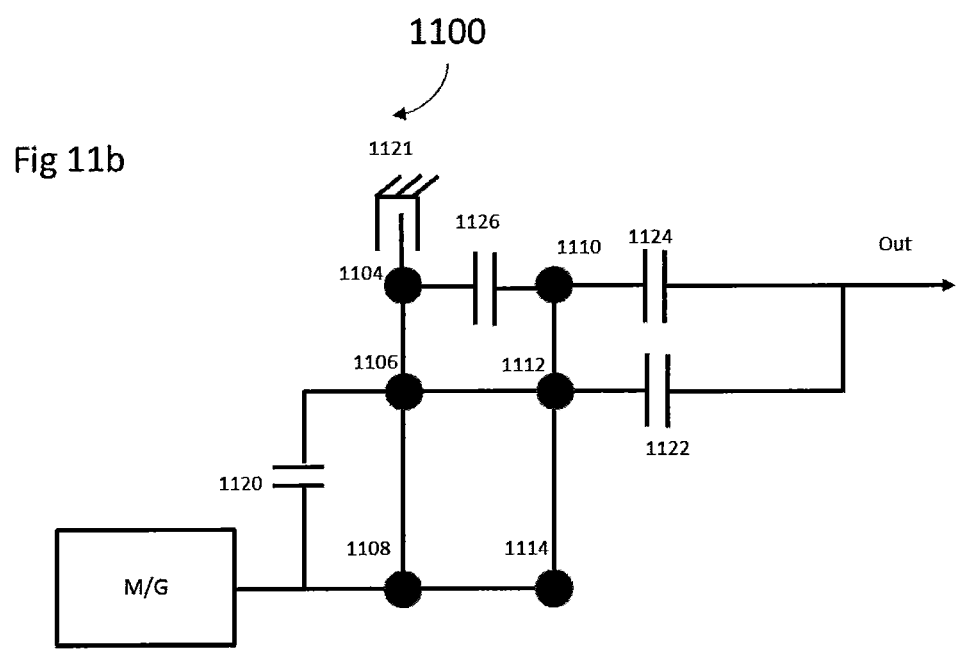

In further embodiments, the gearbox 1100 includes a fourth clutch 1126 that selectively couples the first ring gear 1104 and the second ring gear 1110 as depicted in FIG. 11b. When the first clutch 1120, third clutch 1124, fourth clutch 1126 are engaged and the brake 1121 and second clutch 1122 are disengaged, then the gearbox 1100 operates in a direct drive mode. When the first clutch 1120, second clutch 1122 and fourth clutch 1126 are disengaged and the brake 1121 and third clutch 1124 are engaged, the gearbox 1100 operates in a high-speed gear ratio operational mode. When the first clutch 1120, the third clutch 1124 and fourth clutch 1126 are disengaged and the brake 1121 and second clutch 1122 are engaged, the gearbox 1100 operates in a low-speed gear ratio operational mode. The clutches 1120, 1122, 1124, 1126 are activated using an actuation device including, but not limited to, an electromagnetic or pneumatic actuator.

In some embodiments, as depicted in FIG. 12, the gearbox portions 134, 138, 234, 238, 334, 338, 434, 438, 534, 538 are three-speed planetary gearboxes 1200. The motor-generator 136, 140, 236, 240, 336, 340, 436, 440, 536, 540 is drivingly connected to a planetary gear set 1202. The planetary gear set 1202 is provided with a first ring gear 1204, a first planet carrier 1206, a first sun gear 1208, a second ring gear 1210, a second planet carrier 1212 and a second sun gear 1214. In some embodiments, the first sun gear 1208 is coupled to the motor-generator 136, 140, 236, 240, 336, 340, 436, 440, 536, 540, the first planet carrier 1206 and selectively coupled to the second sun gear 1214 through a first clutch 1220. The first planet carrier 1206 is coupled to the first ring gear 1204 and a second clutch 1222. The second clutch 1222 selectively grounds the first planet carrier 1206. The first ring gear 1204 is coupled to a third clutch 1224 and the second ring gear 1210. The third clutch 1224 selectively grounds the first ring gear 1204. The second ring gear 1218 is coupled to the second planet carrier 1212 and is selectively coupled to the second sun gear 1214 through a fourth clutch 1226. The second planet carrier 1212 is coupled to an output that is drivingly engaged with a wheel assembly 108, 208, 308, 408, 508.

During operation of the gearbox 1200 provides three modes of operation. When the first clutch 1220 and fourth clutch 1226 are engaged and the second clutch 1222 and third clutch 1224 are disengaged, the gearbox 1206 operates in a first direct drive mode. When the first clutch 1220, second clutch 1222 and fourth clutch 1226 are disengaged and the third clutch 1224 is engaged, the gearbox operates in a second mode providing a high speed gear ratio. When the first clutch 1220, second clutch 1222 and third clutch 1224 are disengaged and the fourth clutch 1226 is engaged, the gearbox operates in a second mode providing a low speed gear ratio. The clutches 1220, 1222, 1224, 1226 are activated using an actuation device including, but not limited to, an electromagnetic or pneumatic actuator.

In some embodiments, as depicted in FIG. 13, the gearbox portions 134, 138, 234, 238, 334, 338, 434, 438, 534, 538 are three-speed planetary gearboxes 1300. The motor-generator 136, 140, 236, 240, 336, 340, 436, 440, 536, 540 is drivingly connected to a planetary gear set 1302. The planetary gear set 1302 is provided with a first ring gear 1304, a first planet carrier 1306, a first sun gear 1308, a second ring gear 1310, a second planet carrier 1312 and a second sun gear 1314. In some embodiments, the first sun gear 1308 is coupled to the motor-generator 136, 140, 236, 240, 336, 340, 436, 440, 536, 540, the first planet carrier 1306 and the second sun gear 1314. The first planet carrier 1306 is coupled to the first ring gear 1304 and a first clutch 1320. The first clutch 1320 selectively grounds the first planet carrier 1306. The first ring gear 1304 is coupled to a second clutch 1322 and the second ring gear 1310. The second clutch 1322 selectively grounds the first ring gear 1304. The second ring gear 1318 is coupled to the second planet carrier 1312. The second planet carrier 1312 is coupled to an output that is drivingly engaged with a wheel assembly 108, 208, 308, 408, 508. The second sun gear 1314 is selectively coupled to the output through a third clutch 1324.

During operation of the gearbox 1300 provides three modes of operation. When the first clutch 1320 and second clutch 1322 are disengaged and the third clutch 1324 is engaged, the gearbox 1306 operates in a direct drive mode. When the first clutch 1320 is engaged and the second clutch 1322 and third clutch are disengaged, the gearbox 1306 operates in a first mode providing a low speed gear ratio. When the first clutch 1320 and third clutch 1324 are disengaged and the second clutch 1322 is engaged, the gearbox operates in a second mode providing a high speed gear ratio. The first and second clutches 1320, 1322 are activated by using an actuation device including, but not limited to, an electromagnetic or pneumatic actuator.

In accordance with the provisions of the patent statutes, the present embodiments have been described in what is considered to represent its preferred embodiments, however, it should be noted that the embodiments can be practiced otherwise than as specifically illustrated and described without departing from its scope or spirit.

What is claimed:

1. An electric drivetrain for a motor vehicle, comprising:
   a primary motor-generator assembly including a primary mover, a first gearbox, and a first clutch, wherein the first gearbox is in driving engagement with the primary mover and the first clutch and the first clutch is in selective driving engagement with a drive shaft and the primary mover;
   an electric axle drive unit including a differential assembly, a second motor-generator assembly in driving engagement with a first wheel assembly, a third motor-generator assembly in driving engagement with a second wheel assembly, a first axle clutch and a second axle clutch; and
   a power source in communication with the second motor-generator assembly and the third motor-generator assembly,
   wherein the differential assembly is in selective driving engagement with the first clutch, in selective driving engagement with the second motor-generator assembly via the first axle clutch, and in selective driving engagement the third motor-generator assembly via the second axle clutch,
   wherein the electric axle drive unit is selectively drivingly engaged with the primary motor-generator assembly via the first clutch,
   wherein the second motor-generator assembly includes a second motor-generator and a second gearbox portion,
   wherein the third motor-generator assembly includes a third motor-generator and a third gearbox portion, and
   wherein the third gearbox and second gearbox portions are reduction gearboxes.

2. The electric drivetrain of claim 1, wherein the primary mover is a first motor generator and wherein the power source is in communication with the primary motor-generator assembly.

3. The electric drivetrain of claim 1, wherein the reduction gearboxes are two-speed gearboxes.

4. The electric drivetrain of claim 3, wherein the two-speed gearbox comprises:
a planetary gear set including a first ring gear, a first planet carrier, a first sun gear, a second ring gear, a second planet carrier, a second sun gear, a third ring gear, a third planet carrier, and a third sun gear,
wherein the first sun gear is coupled to the motor-generator and the first planet carrier,
wherein the first planet carrier is coupled to the first ring gear and the second sun gear,
wherein the second ring gear is coupled to the first ring gear and the second planet carrier,
wherein the second planet carrier is coupled to the second sun gear and third sun gear, and
wherein the third planet carrier is coupled to the third ring gear, an output shaft, and the third ring gear; and
a first clutch configured to selectively ground the first ring gear and third ring gear,
wherein the output shaft is drivingly engaged with the wheel assembly.

5. The electric drivetrain of claim 3, wherein the two-speed gearbox comprises:
a planetary gear set including a first ring gear, a first planet carrier, a first sun gear, a second ring gear, a second planet carrier and a second sun gear,
wherein the first sun gear is coupled to the motor-generator, the first planet carrier and the second sun gear,
wherein the first planet carrier is coupled to the first ring gear and the second planet carrier, and
wherein the second ring gear is coupled to the planet carrier;
a brake configured to selectively ground the first ring gear;
a first clutch operably coupled to the second ring gear;
a second clutch operably coupled to the second planet carrier; and
an output shaft drivingly engaged with the wheel assembly,
wherein the first and second clutches are selectively coupled to the output shaft.

6. The electric drive train of claim 5, wherein the planetary gear set further includes a first pinion gear coupled to a second pinion gear and the first ring gear, wherein the first pinion gear and second pinion gear form a stepped pinion gear.

7. The electric drivetrain of claim 3, wherein the two-speed gearbox comprises:
a planetary gear set including a first ring gear, a first planet carrier, a first sun gear, a second ring gear, a second planet carrier and a second sun gear,
wherein the first sun gear is coupled to the motor-generator, the first planet carrier and the second sun gear,
wherein the first planet carrier is coupled to the first ring gear, and
wherein the second ring gear is coupled to the first ring gear and the second planet carrier;
a first clutch coupled to the first ring gear and configured to selectively ground the first ring gear;
a second clutch coupled to the first planet carrier and configured to selectively ground the first planet carrier; and
an output shaft drivingly connected to the second planet carrier and the wheel assembly.

8. The electric drivetrain of claim 1, wherein the reduction gearboxes are three-speed gearboxes.

9. The electric drivetrain of claim 8, wherein the three-speed gearbox comprises:
a planetary gear set including a first ring gear, a first planet carrier, a first sun gear, a second ring gear, a second planet carrier and a second sun gear,
wherein the first sun gear is coupled to the motor-generator, the first planet carrier and the second sun gear,
wherein the first planet carrier is coupled to the first ring gear and the second planet carrier, and
wherein the second ring gear is coupled to the second planet carrier;
an output shaft drivingly engaged with the wheel assembly;
a first clutch configured to selectively couple the motor-generator to the first planet carrier;
a second clutch coupled to the second planet carrier and configured to selectively couple the second planet carrier to the output shaft;
a third clutch coupled to the second ring gear and configured to selectively couple the second ring gear to the output shaft; and
a brake configured to selectively ground the first ring gear.

10. The electric drivetrain of claim 9, wherein the three-speed gearbox further comprises a fourth clutch configured to selectively couple the first ring gear and the second ring gear.

11. The electric drivetrain of claim 8, wherein the three-speed gearbox comprises:
a planetary gear set including a first ring gear, a first planet carrier, a first sun gear, a second ring gear, a second planet carrier and a second sun gear,
wherein the first sun gear is coupled to the motor-generator, the first planet carrier,
wherein the first planet carrier is coupled to the first ring gear, and
wherein the second ring gear is coupled to the first ring gear and the second planet carrier;
an output shaft drivingly engaged with the second planet carrier and the wheel assembly;
a first clutch configured to selectively couple the first sun gear and the second sun gear;
a second clutch configured to selectively couple the second ring gear and the second sun gear;
a third clutch configured to selectively ground the first planet carrier; and
a fourth clutch configured to selectively ground the first ring gear.

12. The electric drivetrain of claim 8, wherein the three-speed gearbox comprises:
a planetary gear set including a first ring gear, a first planet carrier, a first sun gear, a second ring gear, a second planet carrier and a second sun gear,
wherein the first sun gear is coupled to the motor-generator, the first planet carrier and the second sun gear,
wherein the first planet carrier is coupled to the first ring gear, and
wherein the second ring gear is coupled to the first ring gear and the second planet carrier;
an output shaft drivingly engaged with the second planet carrier and the wheel assembly;
a first clutch configured to selectively couple the second sun gear and the output shaft;

a second clutch configured to selectively ground the first planet carrier; and a third clutch configured to selectively ground the first ring gear.

13. The electric drivetrain of claim 1, wherein the reduction gearboxes include a planetary gear set.

14. A motor vehicle comprising the electric drivetrain of claim 1 as a tag axle multi-axle driveline.

15. A motor vehicle comprising the electric drivetrain of claim 1 as a pusher axle in a multi-axle driveline.

16. The electric drivetrain of claim 1, wherein the power source includes a battery.

* * * * *